(12) United States Patent
Tsai et al.

(10) Patent No.: US 11,820,490 B1
(45) Date of Patent: Nov. 21, 2023

(54) METHODS, APPARATUS, AND ARTICLES OF MANUFACTURE FOR ACTUATING CONTROL SURFACES OF AN AIRCRAFT

(71) Applicant: The Boeing Company, Chicago, IL (US)

(72) Inventors: Kevin Tsai, Seattle, WA (US); Mark S. Good, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/751,209

(22) Filed: May 23, 2022

(51) Int. Cl.
*B64C 13/50* (2006.01)
*B64C 9/02* (2006.01)
*B64C 9/06* (2006.01)
*B64C 1/00* (2006.01)
*B64C 1/38* (2006.01)

(52) U.S. Cl.
CPC ............ *B64C 13/50* (2013.01); *B64C 1/0009* (2013.01); *B64C 1/38* (2013.01); *B64C 9/02* (2013.01); *B64C 9/06* (2013.01)

(58) Field of Classification Search
CPC ......... B64C 13/50; B64C 1/0009; B64C 1/38; B64C 9/02; B64C 9/06
See application file for complete search history.

(56) References Cited

U.S. PATENT DOCUMENTS

| 8,038,103 | B2 | 10/2011 | Lacy et al. | |
| 9,815,570 | B2* | 11/2017 | Anderson | B64D 45/0005 |
| 2005/0011994 | A1 | 1/2005 | Sakurai et al. | |
| 2013/0301049 | A1* | 11/2013 | Teague | G01B 11/14 356/400 |
| 2019/0283863 | A1* | 9/2019 | Bowers | B64C 13/30 |
| 2019/0389561 | A1 | 12/2019 | Mokhtarian | |
| 2021/0101671 | A1* | 4/2021 | Tsai | B64C 9/02 |
| 2023/0026667 | A1* | 1/2023 | Walker | B64C 13/34 |

OTHER PUBLICATIONS

United States Patent and Trademark Office, "Non-Final Office Action," issued in connection with U.S. Appl. No. 17/744,272, dated Aug. 30, 2023.

* cited by examiner

*Primary Examiner* — Rodney A Bonnette
(74) *Attorney, Agent, or Firm* — HANLEY, FLIGHT & ZIMMERMAN

(57) ABSTRACT

Methods, apparatus, and articles of manufacture for actuating control surfaces of an aircraft are disclosed. An example apparatus to control a control surface of an aerodynamic body includes a track rotatable about a pivot of a support structure of the aerodynamic body, the control surface slidably coupled to the track, a first actuator operatively coupled to the track, the first actuator to cause rotation of the track and the flaperon about the pivot, and a second actuator operatively coupled to the control surface, the second actuator to cause translation of the control surface along the track.

23 Claims, 15 Drawing Sheets

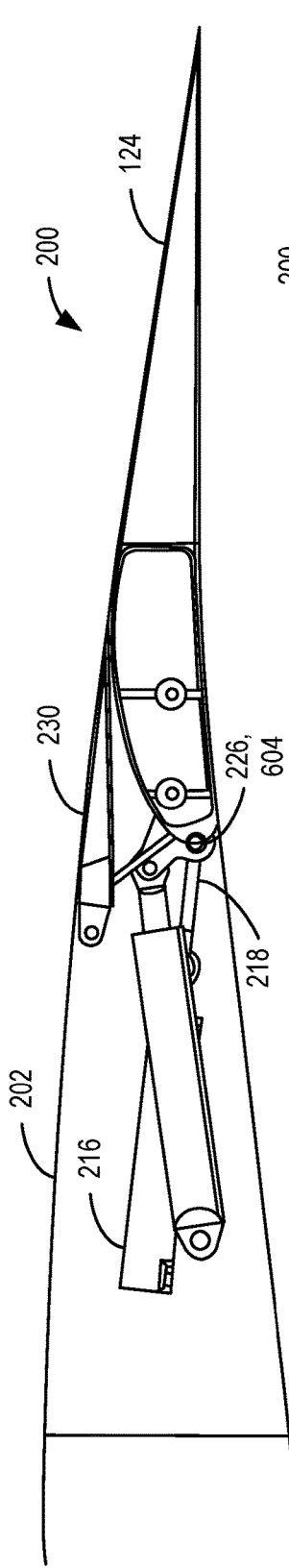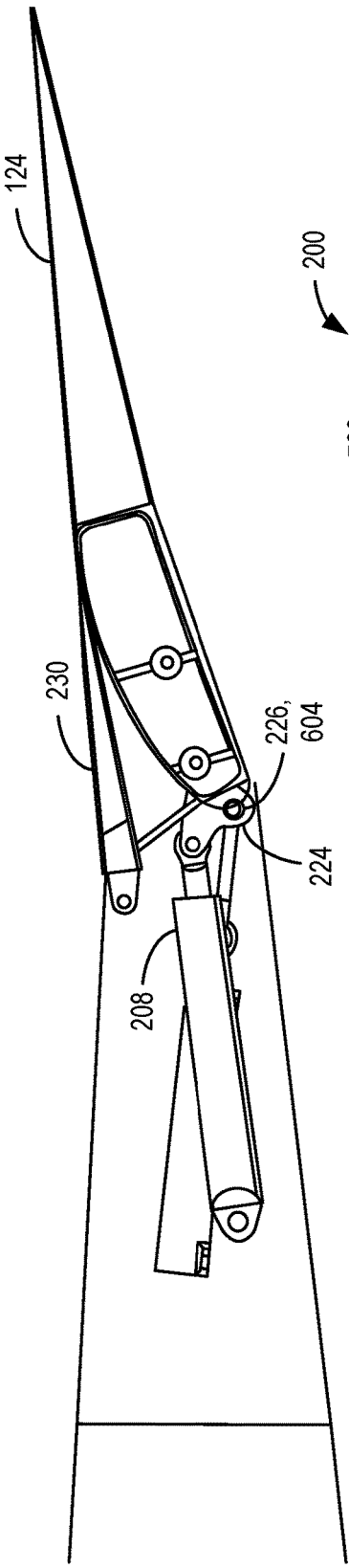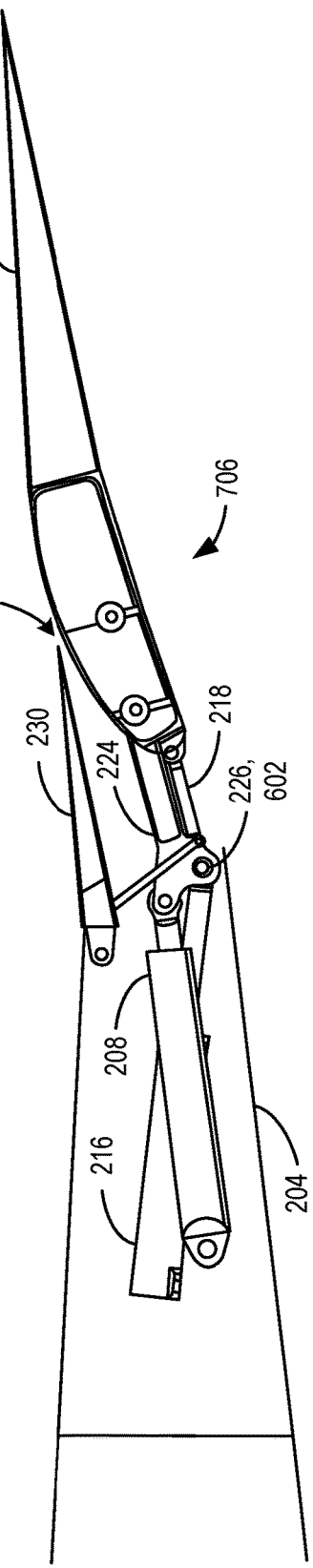
FIG. 7A
FIG. 7B
FIG. 7C

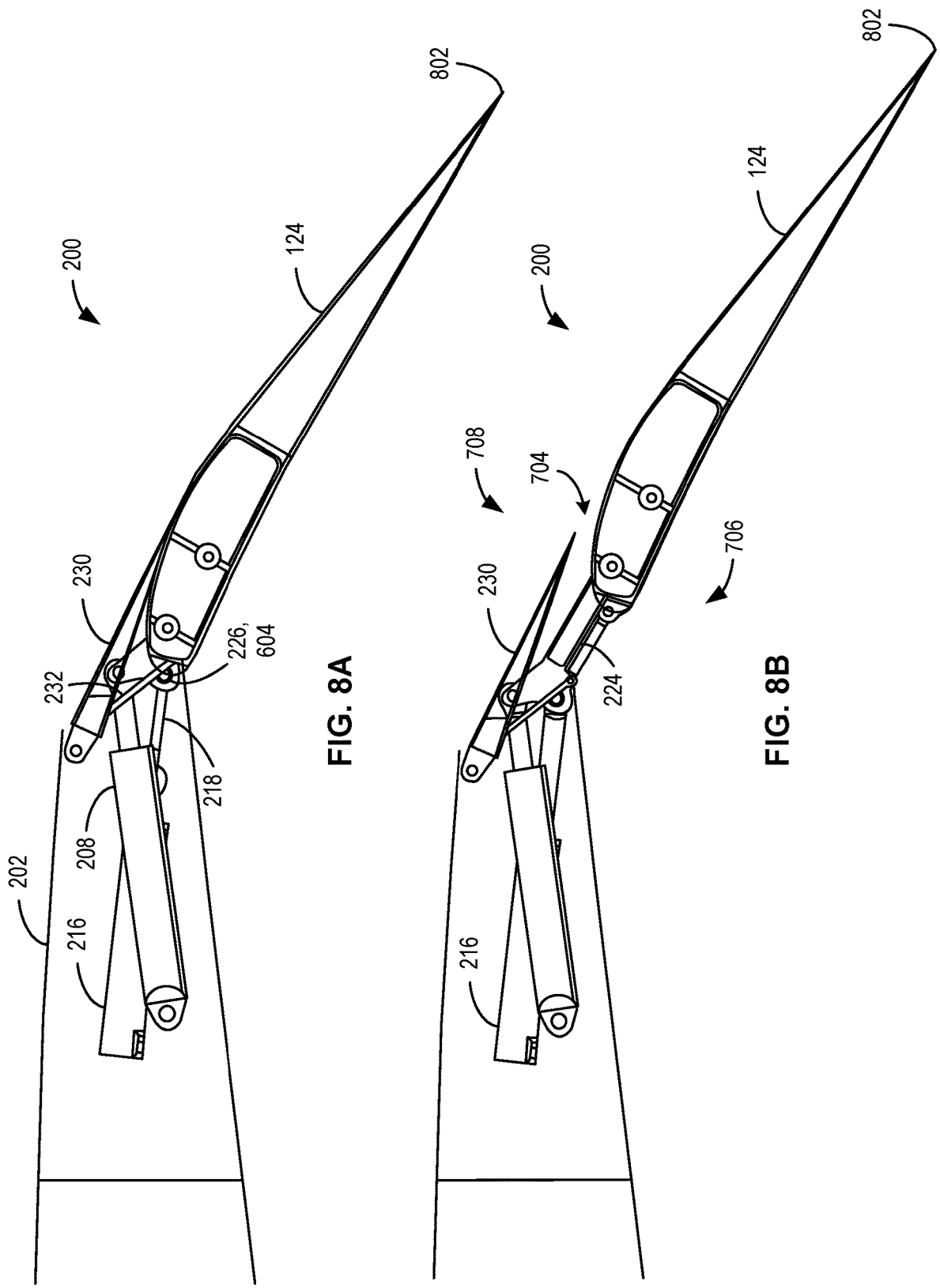

METHODS, APPARATUS, AND ARTICLES OF MANUFACTURE FOR ACTUATING CONTROL SURFACES OF AN AIRCRAFT

FIELD OF THE DISCLOSURE

This disclosure relates generally to aircraft and, more particularly, to methods, apparatus, and articles of manufacture for actuating control surfaces of an aircraft.

BACKGROUND

Fixed-wing planes typically include control surfaces movably coupled to a wing thereof. The control surfaces are selectively actuated to affect behavior of the aircraft during flight, takeoff, and/or landing. For instance, a flaperon pivotably coupled to the wing may be rotated relative to a wing surface to affect lift and/or drag forces acting on the wing. In particular, the flaperon may be deflected upward or downward to control roll of the aircraft.

SUMMARY

An example apparatus to control a control surface of an aerodynamic body is disclosed. The example apparatus includes a track rotatable about a pivot of a support structure of the aerodynamic body. The control surface is slidably coupled to the track. A first actuator is operatively coupled to the track, the first actuator to cause rotation of the track and the control surface about the pivot. A second actuator is operatively coupled to the control surface, the second actuator to cause translation of the control surface along the track.

An example method of operating a control surface of an aerodynamic body is disclosed. The example method includes causing movement of a first actuator operatively coupled to a track, the track rotatable about a pivot of a support structure of the aerodynamic body, the control surface slidably coupled to the track, the movement of the first actuator to cause rotation of the track and the control surface about the pivot. The method further includes causing movement of a second actuator operatively coupled to the control surface, the movement of the second actuator to cause translation of the control surface along the track.

An example method of manufacturing an aerodynamic body is disclosed. The example method includes rotatably coupling a track to a pivot of a support structure of the aerodynamic body, slidably coupling a control surface to the track, operatively coupling a first actuator to the track, the first actuator to cause rotation of the track and the control surface about the pivot, and operatively coupling a second actuator to the control surface, the second actuator to cause translation of the control surface along the track.

An example aerodynamic body is disclosed. The example aerodynamic body includes a support structure, a control surface, and a track slidably coupled to the control surface and rotatably coupled to the support structure. A first pivot of the track is to be moved by a first actuator, the first actuator to cause the track to rotate about a second pivot of the track. A third pivot of the control surface is to be moved by a second actuator coupled to the third pivot via a link, the second actuator to cause the control surface to slide along the track.

BRIEF DESCRIPTION OF THE DRAWINGS

FIG. 7A is a side view of the example actuation system of FIG. 2 depicting the example flaperon in a neutral position.

FIG. 7B is a side view of the example actuation system of FIG. 2 with the example flaperon depicted in an upward retracted position.

FIG. 7C is a side view of the example actuation system of FIG. 2 with the example flaperon depicted in an upward extended position.

FIG. 8A is a side view of the example actuation system of FIG. 2 with the example flaperon depicted in a downward retracted position.

FIG. 8B is a side view of the example actuation system of FIG. 2 with the example flaperon depicted in a downward extended position.

Figure 1:
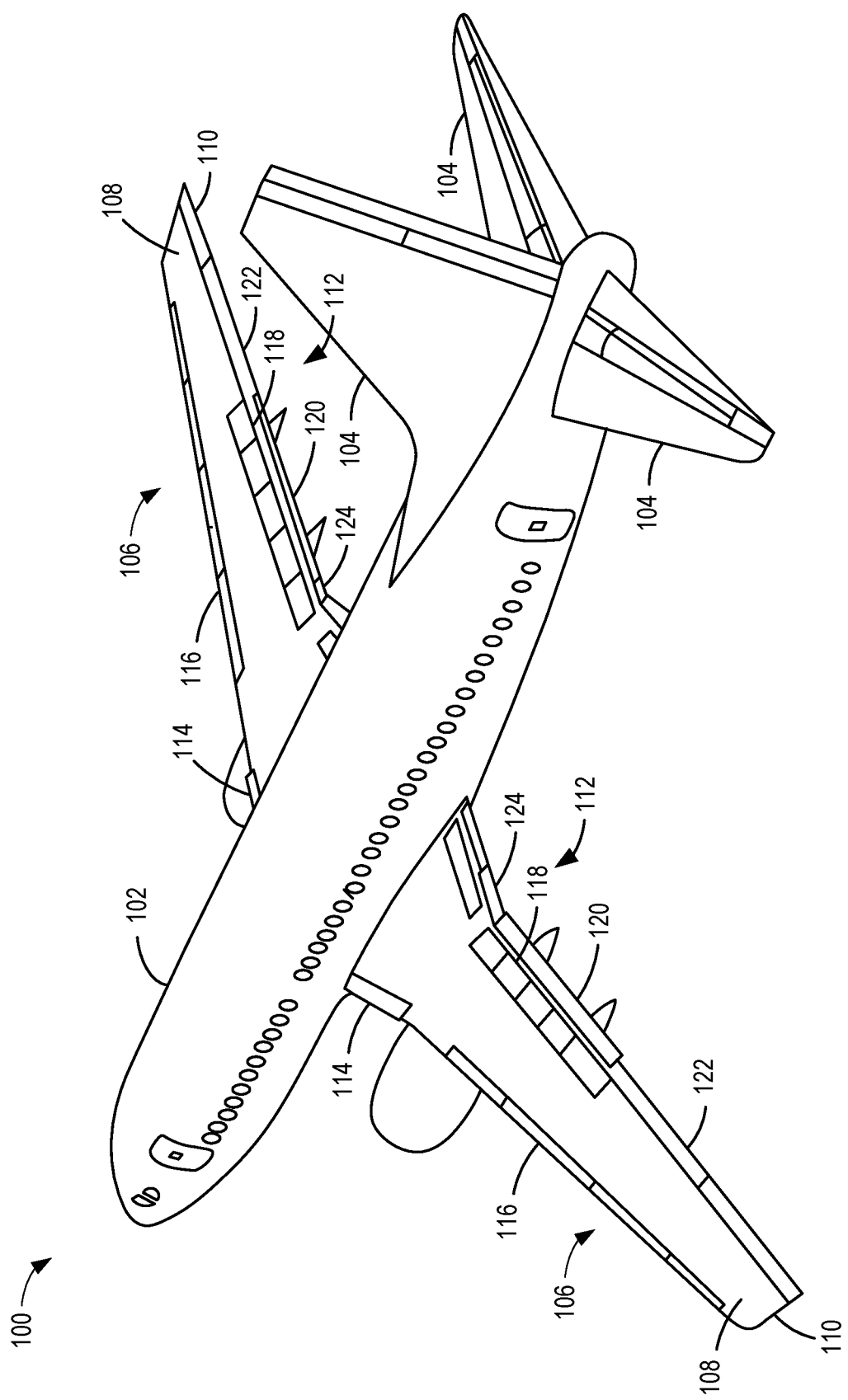
FIG. 1 illustrates an example aircraft in which examples disclosed herein may be implemented.

In general, the same reference numbers will be used throughout the drawing(s) and accompanying written description to refer to the same or like parts. The figures are not to scale. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Fixed-wing aircraft typically include control surfaces movably coupled to an aerodynamic body (e.g., a wing) of the aircraft. These control surfaces are selectively actuated to affect behavior of the aircraft during flight, takeoff, and/or landing. The aforementioned control surfaces can include spoilers, leading edge flaps, leading edge slats, trailing edge flaps, ailerons, and/or flaperons, any of which can be operatively coupled to wings, stabilizers, and/or other exterior surfaces of the aircraft. Typically, one or more actuators (e.g., linear actuators) are operatively coupled to the control surfaces to control movement thereof. For instance, a flaperon pivotably coupled to a wing of the aircraft moves between a stowed position and a deployed position to affect lift and/or roll of the aircraft. Known flaperon assemblies are typically single degree of freedom (DOF) implementations in which the flaperon rotates about a fixed pivot on the wing.

In some known flaperon assemblies, it may be desirable to enable airflow from a lower surface of the flaperon to an upper surface of the flaperon to improve lift capabilities of the wing. As such, some known flaperon assemblies include a cove lip door that can be opened to enable airflow between the upper and lower surfaces of the flaperon. However, such cove lip doors often require additional actuators and/or linkage mechanisms to control actuation thereof, and thus may not be feasible with relatively thin wing designs. Additionally or alternatively, the fixed pivot of the flaperon can be moved to a location below a lower skin of the wing, such that a gap is formed between the flaperon and the wing body when the flaperon is deployed. In such cases, air can flow through the gap to affect lift capabilities of the wing. However, placing the fixed pivot below the lower skin of the wing requires an additional fairing to be coupled to the wing. The additional fairing may increase drag and, thus, reduce aerodynamic performance of the aircraft.

As used herein, the term "aerodynamic body" refers to an exterior or outboard structure (e.g., a wing, a horizontal stabilizer, a wing strut, an engine strut, etc.) of an aircraft. As used herein, the term "control surface" refers to a component, assembly, and/or device that is moved to affect flight of an aircraft. Accordingly, the term "control surface" can refer to a flaperon, a leading edge flap, a leading edge slats, a spoiler, a trailing edge flap, an aileron, etc. As used herein, the term "chord" refers to a distance of an aerodynamic body measured between a leading edge and a trailing edge of the aerodynamic body. As used herein, the term "camber" refers to a vertical height of an aerodynamic body measured between a first point on a top surface of the aerodynamic body and a second point on a bottom surface of the aerodynamic body.

Examples disclosed herein implement a two-DOF system for accurately controlled actuation of an example control surface (e.g., a flaperon) of an aerodynamic body (e.g., a wing) of an aircraft. An example actuation system disclosed herein includes a first example actuator (e.g., a rotation actuator) and a second example actuator (e.g., a translation actuator) operatively coupled to the control surface. According to examples disclosed herein, the aforementioned control surface is slidably coupled to a track that is rotatable about a pivot of the aerodynamic body. The first actuator causes rotation of the track and the control surface about the pivot, and the second actuator causes translation of the control surface along the track. In particular, the translation of the control surface is guided by a channel of the track. In some examples, rotation and/or translation of the control surface modifies a chord and/or camber of the aerodynamic body, thereby affecting flight characteristics (e.g., lift, roll, and/or drag) of the aircraft.

Advantageously, by controlling movement (e.g., rotation and translation) of the control surface along two degrees of freedom, examples disclosed herein can increase lift capabilities of an aerodynamic body in comparison to known one-DOF systems. In particular, examples disclosed herein increase a total chord and total camber of the control surface compared to known control surfaces that do not translate. Thus, example control surfaces disclosed herein can provide increased lift capabilities compared to known control surfaces. Furthermore, examples disclosed herein provide a gap between the control surface and an upper shroud of the aerodynamic body when the control surface is in an extended position, thereby enabling air flow from a lower surface of the aerodynamic body to an upper surface of the aerodynamic body through the gap. In particular, examples disclosed herein enable air flow through the gap to improve lift capabilities without necessitating a cove lip door and/or additional fairings to be implemented on the aerodynamic body. Thus, examples disclosed herein can reduce drag compared to known control surface actuation systems. Further, examples disclosed herein reduce complexity and/or part costs associated with the actuation system by not necessitating a cove lip door and/or additional fairings to be implemented on the aerodynamic body.

FIG. 1 illustrates an example aircraft 100 in which examples disclosed herein may be implemented. In the illustrated example of FIG. 1, the aircraft 100 includes an example fuselage 102, example stabilizers 104 coupled to the fuselage 102, and example wings (e.g., wing bodies, aerodynamic bodies) 106 coupled to the fuselage 102. In this example, the aircraft 100 is a fixed-wing aircraft. However, the aircraft 100 of FIG. 1 can be implemented as a different type and/or form of aircraft including at least one aerodynamic body having at least one control surface thereon. In this example, the wings 106 define example upper and lower surfaces (e.g., upper and lower sides, upper and lower aerodynamic surfaces, etc.) 108, 110, respectively. Further, the wings 106 of the aircraft 100 have example control surfaces 112 located along the leading and/or trailing edges of the wings 106. The control surfaces 112 may be displaced or adjusted (e.g., angled, etc.) to provide lift during takeoff, landing, and/or flight maneuvers. In the illustrated example of FIG. 1, the control surfaces 112 include example leading edge flaps 114, example leading edge slats 116, example spoilers 118, example trailing edge flaps 120, example ailerons 122, and example flaperons 124.

To control flight of the aircraft 100, the spoilers 118 of the illustrated example alter lift and drag of the aircraft 100. Further, the flaps 114 alter the lift and pitch of the aircraft 100, while the ailerons 122 and the flaperons 124 of the illustrated example alter lift and/or roll of the aircraft 100. For example, the flaperons 124 can be deployed asymmetrically to alter roll of the aircraft 100, and/or can be deployed symmetrically to alter lift of the aircraft 100. The control surfaces 112 of the illustrated example can also be used to affect speed of the aircraft 100. For example, the spoilers 118 may be used for braking of the aircraft 100. In some examples, the control surfaces 112 are operated (e.g., displaced, deflected) independently of one another to control load distribution over the respective wings 106 and, thus, control movement of the aircraft 100. While examples disclosed herein are described in connection with the flaperons 124, examples disclosed herein may be applied to one or more of the control surfaces 112 associated with the stabilizers 104, the wings 106, and/or other exterior or outboard structures (e.g., a horizontal stabilizer, a wing strut, an engine strut, etc.) of the aircraft 100.

Figure 2:
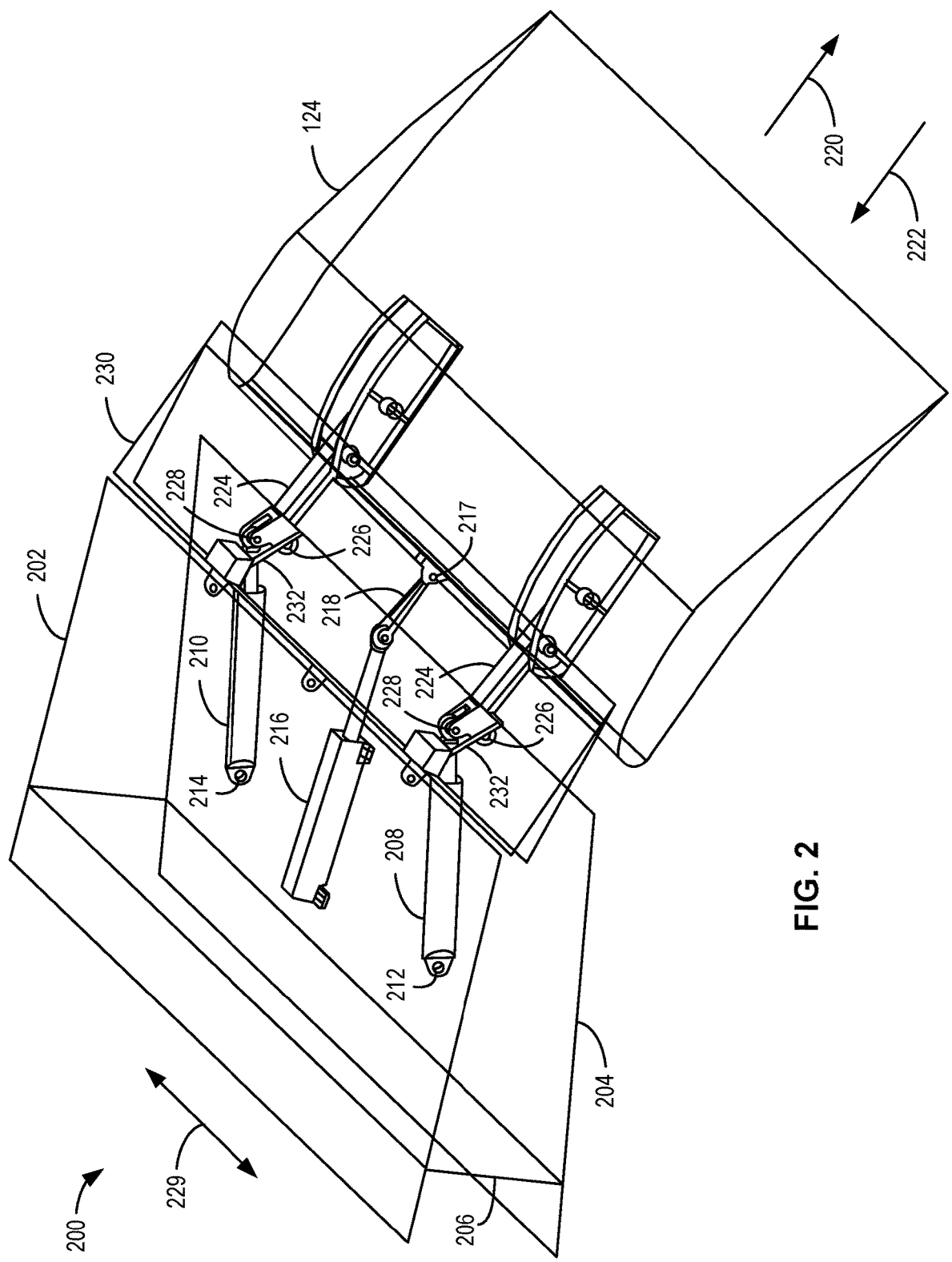
FIG. 2 illustrates an example actuation system in accordance with teachings of this disclosure.

FIG. 2 illustrates an example actuation system 200 in accordance with teachings of this disclosure. In this example, the actuation system 200 is implemented with and/or operatively coupled to one of the flaperons 124 of the aircraft 100 shown in FIG. 1 to control movement thereof. In other examples, the actuation system 200 can be implemented in connection with one or more different control surfaces (e.g., the leading edge flaps 114, the leading edge slats 116, the spoilers 118, the trailing edge flaps 120, the ailerons 122, etc.) of the aircraft 100.

In the illustrated example of FIG. 2, an example upper skin 202, an example lower skin 204, and an example wing spar 206, which is coupled between the upper and lower skins 202, 204, are support structures that form and/or otherwise define a portion of the wing 106 of FIG. 1 proximate a trailing edge of the wing 106. As can be seen in FIG. 2, example rotation actuators (e.g., first and second linear actuators) 208, 210 are pivotably coupled (e.g., rotatably coupled) to the lower skin 204 at respective example actuator pivots 212, 214. Further, an example translation actuator (e.g., a third linear actuator) 216 is operationally coupled (e.g., fixedly coupled) to the lower skin 204. While one translation actuator 216 is used in this example, multiple ones of the translation actuator 216 may be used instead. In some examples, the translation actuator 216 is operated symmetrically with a second translation actuator 216, where the translation actuators 216 are implemented on corresponding left and right sides of the aircraft 100. In this example, the translation actuator 216 is coupled to the lower skin 204 at four different positions with bolts. In other examples, the translation actuator 216 can be operatively coupled to the lower skin 204 using a different number of bolts, different fasteners and/or a different coupling method (e.g., welding, etc.). While the rotation actuators 208, 210 and the translation actuator 216 are coupled to the lower skin 204 in this example, at least one of the rotation actuators 208, 210 or the translation actuator 216 can additionally or alternatively be coupled to the upper skin 202 and/or the wing spar 206 (or any other appropriate component).

In this example, the translation actuator 216 is operatively coupled to the flaperon 124 at an example pivot 217 via an example flap coupler link 218 that couples motion therebetween. In particular, the translation actuator 216 extends to move the flap coupler link 218 and, thus, the flaperon 124 in a rearward direction 220 of the aircraft 100 of FIG. 1. Conversely, the translation actuator 216 retracts to move the flap coupler link 218 and, thus, moves the flaperon 124 in a forward direction 222 of the aircraft 100. As such, operation of the translation actuator 216 can modify a chord of the wing 106 of FIG. 1, where the chord can be defined as a length of the wing 106 measured between the leading edge and the trailing edge of the wing 106.

In the illustrated example of FIG. 2, tracks (e.g., pivot members) 224 are pivotably coupled to the lower skin 204 at pivots (e.g., fixed pivots, hinges, pin joints) 226. Further, the example rotation actuators 208, 210 are rotatably coupled to the respective tracks 224 at example pivots 228 of the tracks 224, where the pivots 228 are spatially offset from the corresponding pivots 226. In this example, the pivots 226, 228 are offset from the pivot 217 of the flaperon 124 along an example spanwise direction 229. In this example, extension of the rotation actuators 208, 210 causes the tracks 224 to rotate downward about the pivots 226 and, conversely, retraction of the rotation actuators 208, 210 causes the tracks 224 to rotate upward about the pivots 226. Further, the example flaperon 124 is slidably coupled to the tracks 224 to rotate with and slide and/or translate along the tracks 224. In some examples, rotation of the tracks 224 and the flaperon 124 in a downward direction can increase a camber of the wing 106, and rotation of the tracks 224 and the flaperon 124 in an upward direction can, thus, reduce the camber of the wing 106.

In the illustrated example of FIG. 2, an example upper shroud 230 is pivotably coupled to the upper skin 202 of the wing 106. In some examples, the upper shroud 230 is coupled to the tracks 224 via corresponding example shroud coupler links (e.g., shroud coupling members) 232. In such examples, movement of the shroud coupler links 232 causes the upper shroud 230 to rotate with the tracks 224 and the flaperon 124. As a result, the upper shroud 230 provides a smooth geometric transition from a surface of the upper skin 202 to an upper surface of the flaperon 124.

In some examples, the rotation actuators 208, 210 are fast actuators that move (e.g., extend and/or retract) at a faster rate compared to the translation actuator 216. In such examples, a size of the translation actuator 216 can be reduced compared to a size of the rotation actuators 208, 210. In other examples, the translation actuator 216 can be implemented as a fast actuator similar to the rotation actuators 208, 210.

Figure 3:
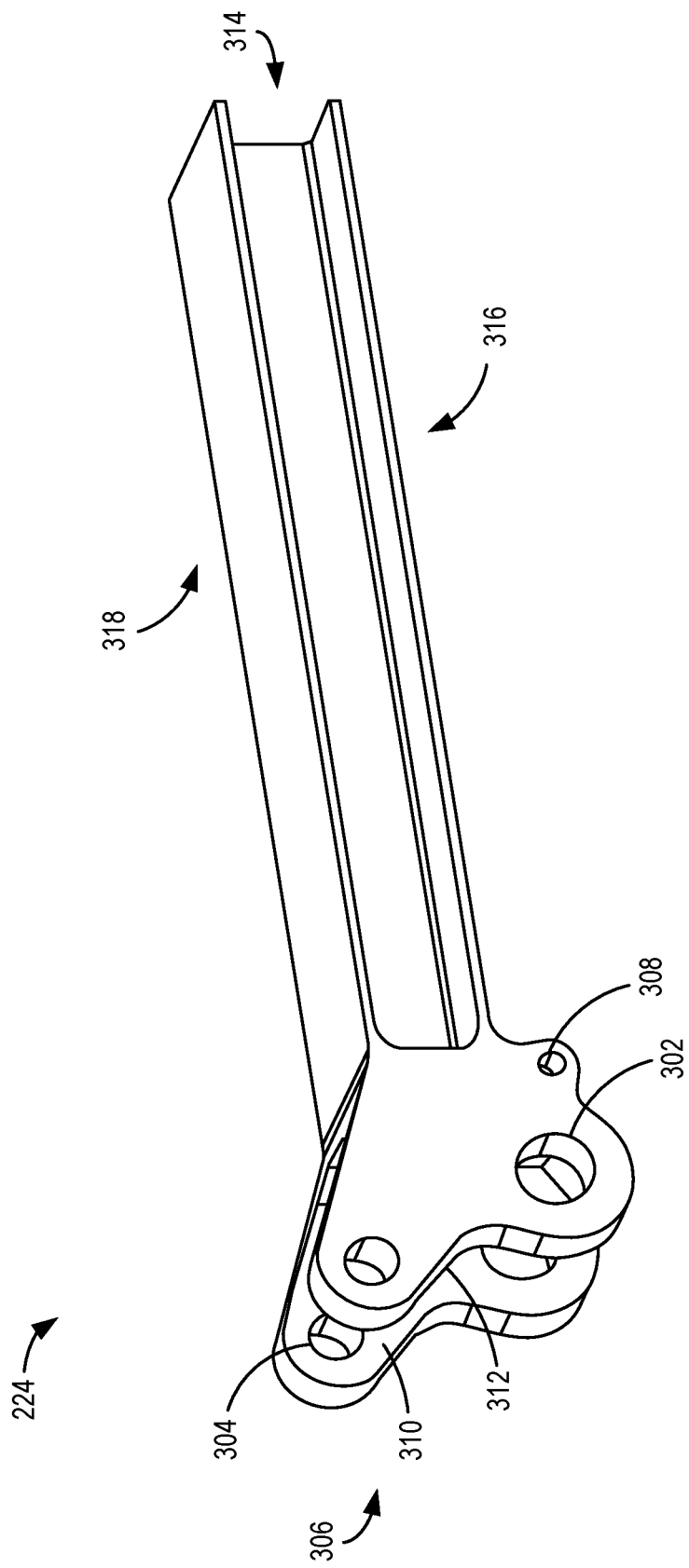
FIG. 3 is a detailed view of an example track of the example actuation system of FIG. 2.

FIG. 3 is a detailed view of the example track 224 of FIG. 2. In the illustrated example of FIG. 3, the track 224 includes first and second example openings 302, 304 proximate a first end (e.g., a proximal end) 306 of the track 224. In this example, pins can be inserted into the first and second openings 302, 304 to define the pivots 226, 228 shown in FIG. 2, respectively. In this example, the track 224 further includes a third example opening 308 proximate the first end 306 of the track 224. In some examples, the shroud coupler link 232 of FIG. 2 can be pivotably coupled to the track 224 via a pin inserted into the third opening 308. In some examples, a respective end of one of the rotation actuators 208, 210 of FIG. 2 can be positioned between example inner surfaces 310, 312 of the track 224.

In the illustrated example of FIG. 3, the track 224 exhibits a generally I-shaped cross-sectional profile. In particular, the track 224 includes example channels 314 on first and second sides 316, 318 of the track 224. In some examples, the example flaperon 124 shown in FIGS. 1 and 2 can be slidably coupled to the track 224 via one or more wheels and/or bearings that can slidably and/or translatably move within the channels 314. While the example track 224 includes the channels 314 on both of the first and second sides 316, 318 in this example, the track 224 may, instead, include one of the channels 314 on either the first side 318 or the second side 318.

Figure 4:
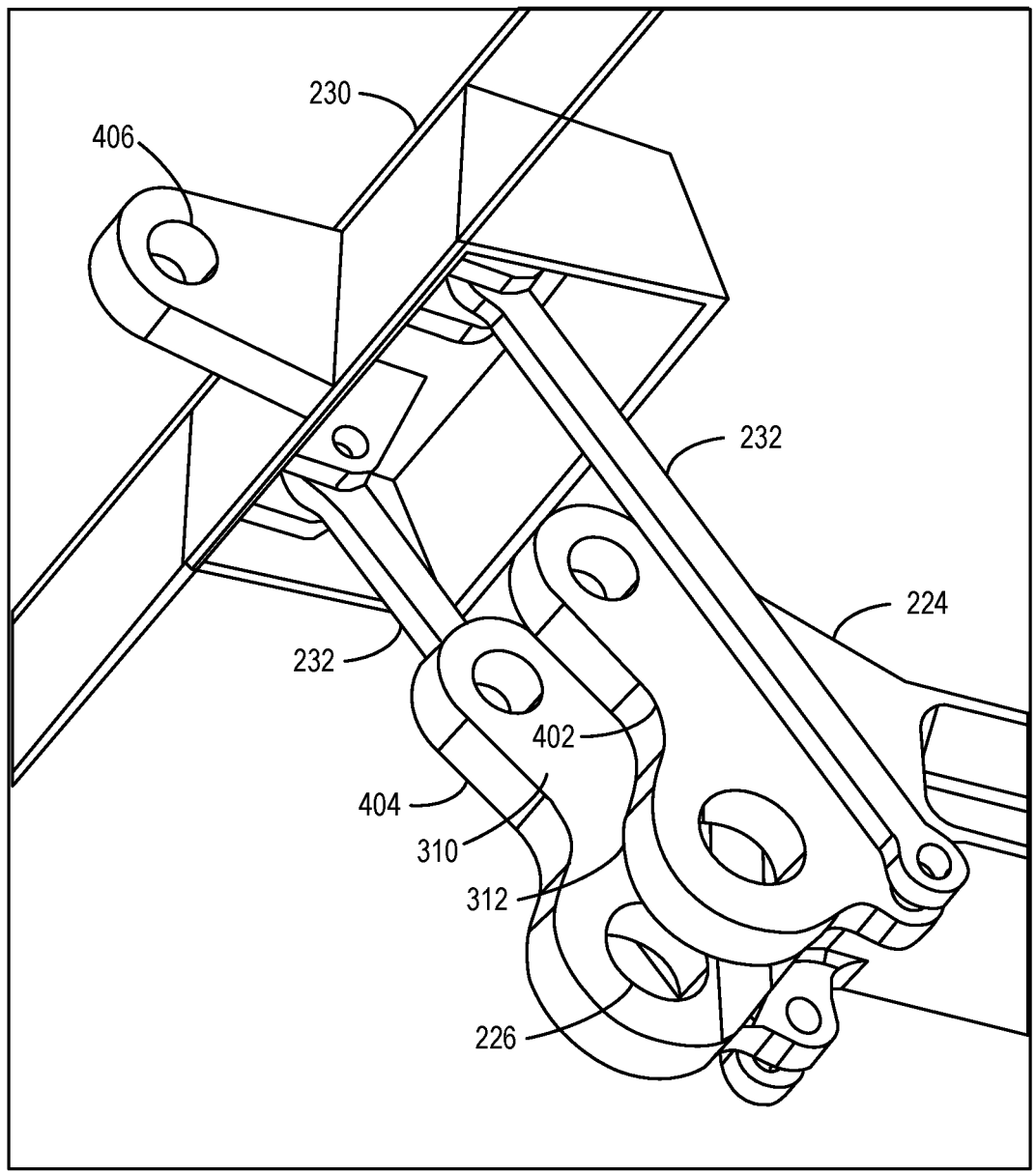
FIG. 4 is a detailed view of a portion of the example track of FIGS. 2 and 3 coupled to an example upper shroud of the example actuation system of FIG. 2.

FIG. 4 is a detailed view of a portion of the example track 224 (shown in FIGS. 2 and 3) coupled to the example upper shroud 230. In the illustrated example of FIG. 4, the track 224 is coupled to the upper shroud 230 using two of the shroud coupler links 232. Further, the example shroud coupler links 232 are positioned proximate or at example outer surfaces 402, 404 of the track 224. In other examples, the shroud coupler links 232 are positioned proximate the inner surfaces 310, 312 of the track 224. While two of the shroud coupler links 232 are utilized in this example, one or more of the shroud coupler links 232 may be used, instead. In some examples, the shroud coupler links 232 cause the upper shroud 230 to rotate and/or pivot about an example pivot 406 when the track 224 rotates about the pivot 226.

Figure 5:
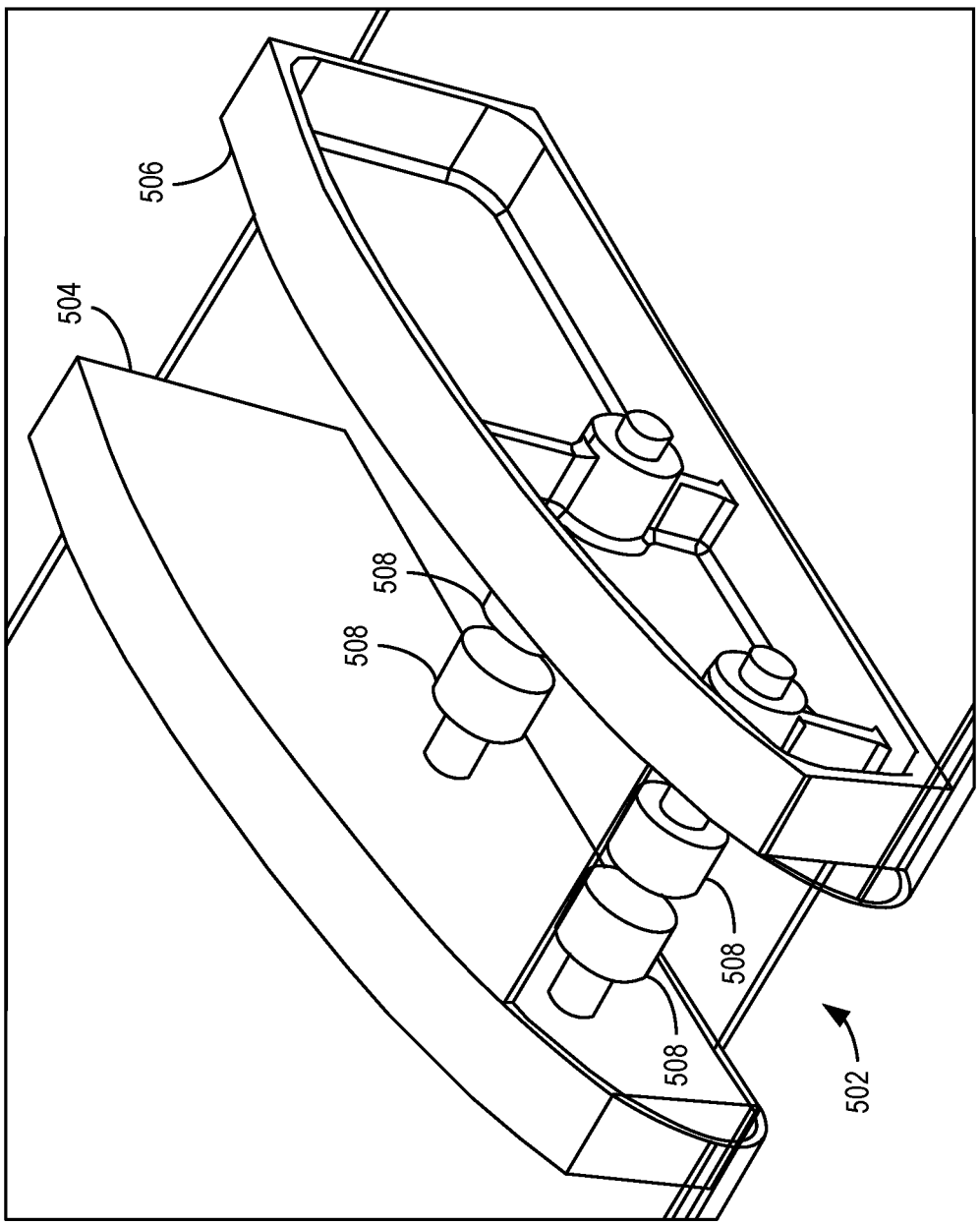
FIG. 5 is a partially transparent view of an example flaperon of the example aircraft of FIG. 1.

FIG. 5 is a partially transparent view of a portion of the example flaperon 124 shown in FIGS. 1 and 2. In the illustrated example of FIG. 5, the flaperon 124 includes a cutout 502 in which the example track 224 shown in FIGS. 2 and 3 can be positioned. In this example, the cutout 502 is defined between a first example surface 504 and a second example surface 506 of the flaperon 124. In the illustrated view of FIG. 5, the example flaperon 124 includes rollers (e.g., wheels, roller bearings) 508 extending from the first and second surfaces 504, 506 and rotatably coupled to the flaperon 124. In this example, two of the rollers 508 extend from the first surface 504, and two of the rollers 508 extend from the second surface 506. In other examples, at least one of the rollers 508 is coupled to the first surface 504 and/or the second surface 506. In some examples, the rollers 508 are disposed in (and move along) respective ones of the channels 314 on the first and second sides 316, 318 of the track 224 of FIG. 3. In such examples, the rollers 508 can roll and/or otherwise rotate within the channels 314 to enable translation of the flaperon 124 along the track 224.

Figure 6A:
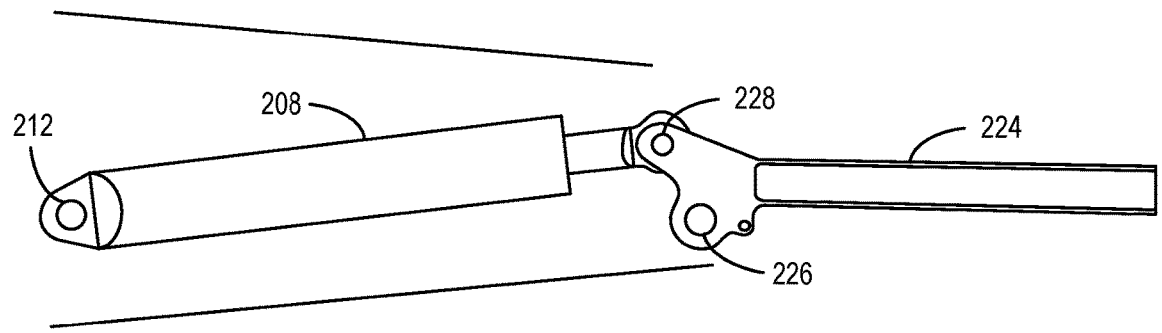
FIG. 6A is a side view of an example rotation actuator coupled to the example track of FIGS. 2 and 3.

FIG. 6A is a side view of the example rotation actuator 208 of FIG. 2 shown with a corresponding one of the tracks 224 of FIG. 2. In the illustrated example of FIG. 6A, extension of the rotation actuator 208 displaces the track 224 at the pivot 228 to move the track 224 in a rightward direction of the view of FIG. 6A, thereby causing the track 224 to rotate clockwise about the pivot 226 in the view of FIG. 6A. Conversely, retraction of the rotation actuator 208 displaces the track 224 at the pivot 228 to move the track 224 in a leftward direction of the view of FIG. 6A, thereby causing the track 224 to rotate counterclockwise about the pivot 226 in the view of FIG. 6A. In this example, the rotation actuator 208 can pivot about the actuator pivot 212 when extending and/or retracting.

Figure 6B:
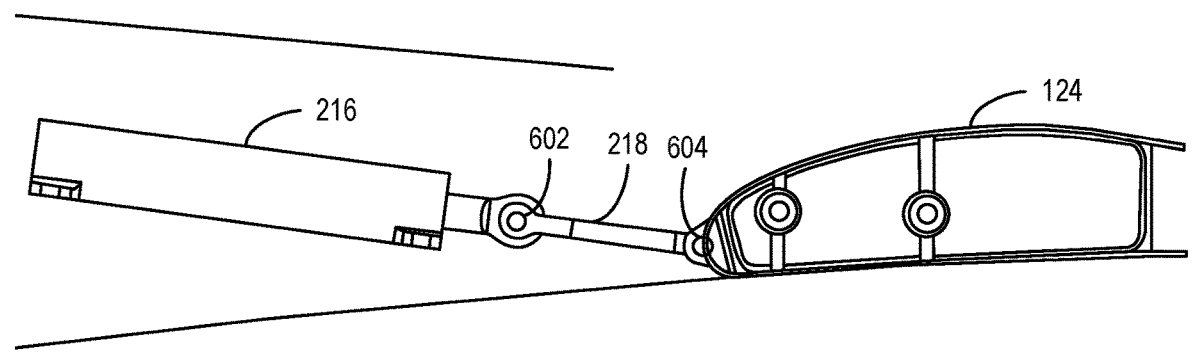
FIG. 6B is a side view of an example translation actuator coupled to the example flaperon of FIG. 5 via an example flap coupler link.

FIG. 6B is a side view of the example translation actuator 216 that is coupled to the flaperon 124 via the flap coupler link 218. According to the illustrated example of FIG. 6A, the translation actuator 216 moves between an extended position (e.g., a fully extended position) and a retracted position (e.g., a fully retracted position) to move (e.g., slide, translate, etc.) the flaperon 124 along the track 224 of FIG. 6A. In this example, the flap coupler link 218 is pivotably coupled to the translation actuator 216 at a first example pivot 602 that defines a first rotational axis, and the flap coupler link 218 is pivotably coupled to the flaperon 124 at a second example pivot 604 that defines a second rotational axis. In some examples, when the translation actuator 216 is in the extended position, the first pivot 602 is approximately coincident with the pivot 226 shown in FIG. 6A. In such examples, the flap coupler link 218 and the flaperon 124 can rotate about the first pivot 602 and, thus, rotate with the track 224 about the pivot 226. Conversely, when the translation actuator 216 is in the retracted position, the second pivot 604 is approximately coincident with the pivot 226. In such examples, the flaperon 124 can rotate about the second pivot 604 along with the track 224 about the pivot 226.

Figure 6C:
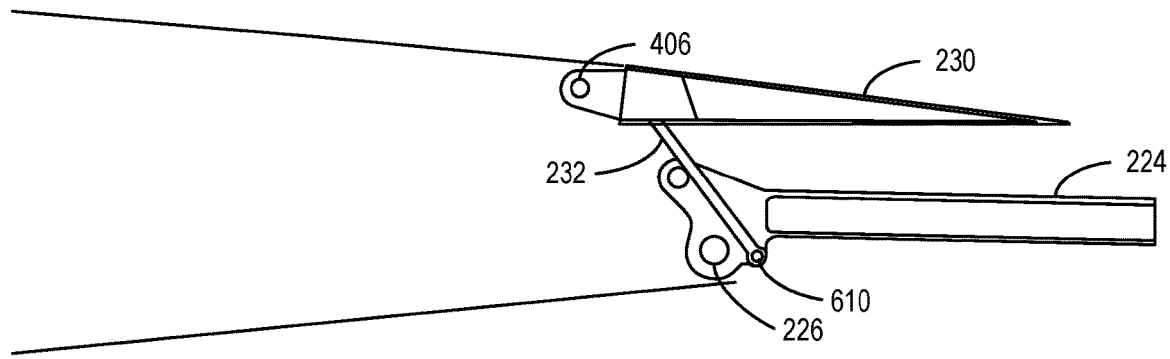
FIG. 6C is a side view of the example track of FIGS. 2 and 3.

FIG. 6C is a side view of the track 224 that is coupled to the upper shroud 230 via the shroud coupler link 232. In the illustrated example of FIG. 6C, a first end 610 of the shroud coupler link 232 is rotatably coupled to the track 224 at an offset from the pivot 226 of the track 224. In some examples, rotation of the track 224 about the pivot 226, in turn, causes corresponding rotation of the upper shroud 230 about the pivot 406.

FIG. 7A is a side view of the example actuation system 200 of FIG. 2 depicting the flaperon 124 in a neutral position. In this neutral position, corresponding surfaces of the flaperon 124, the upper shroud 230, and the upper skin 202 are substantially aligned. Furthermore, the upper shroud 230 engages with and/or contacts an upper surface of the flaperon 124 such that a seal is formed therebetween. In such examples, the seal prevents air flow between the upper shroud 230 and the flaperon 124. In this example, the translation actuator 216 is fully retracted, such that the pivot 226 of the track 224 is coincident with the second pivot 604 of the flap coupler link 218.

FIG. 7B is a side view of the example actuation system 200 with the flaperon 124 shown in an upward retracted position. In this example, to move the flaperon 124 from the neutral position of FIG. 7A to the upward retracted position of FIG. 7B, retraction of the rotation actuator 208 causes the track 224 and, thus, the flaperon 124 to rotate upward (e.g., counterclockwise in the illustrated example of FIG. 7B) about the pivot 226 and/or the second pivot 604. In this example, the upper shroud 230 rotates upward with the flaperon 124 and is sealably engaged with the flaperon 124.

FIG. 7C is a side view of the example actuation system 200 with the flaperon 124 shown in an upward extended position. In this example, the translation actuator 216 is in the fully extended position, where the first pivot 602 of the flap coupler link 218 is coincident with the pivot 226 of the track 224. Further, when the example translation actuator 216 is in the fully extended position, the flaperon 124 is displaced rearward along the track 224. In such examples, a chord of the wing 106 shown in FIG. 1 increases when the flaperon 124 extends. For example, the chord is greater when the flaperon 124 is in the upward extended position of FIG. 7C than when the flaperon 124 is in the upward retracted position shown in connection with FIG. 7B. In some examples, when the flaperon 124 is in an upward position (e.g., the upward retracted position of FIG. 7B or the upward extended position of FIG. 7C), the flaperon 124 can reduce lift on the wing 106 to control a maneuver the aircraft 100. For example, the flaperon 124 can be moved upward to adjust roll of the aircraft 100, reduce altitude of the aircraft 100 during cruise, or cause braking of the aircraft 100 on the ground.

In the illustrated example of FIG. 7C, when the flaperon 124 is at least partially deployed and/or in the upward extended position, inflection of the camber of the flaperon 124 in an upward direction reduces lift on an upper surface of the wing 106. In this example, an example gap (e.g., an opening, a slot) 704 is formed between the flaperon 124 and the upper shroud 230. In some examples, the gap 704 enables airflow therethrough. In particular, air can flow through the gap 704 from an example lower surface 706 of the flaperon 124 and/or the lower skin 204 to an example upper surface 708 of the flaperon 124 and/or the lower skin 204. In such examples, enabling air flow from the lower surface 706 to the upper surface 708 alters lift capabilities and/or performance efficiency of the wing 106. For example, when the flaperon 124 is in the upward extended position, air flow through the gap 704 can increase drag on the wing 106 and, thus, may enable the aircraft 100 to maneuver in a desired direction.

FIG. 8A is a side view of the example actuation system 200 with the flaperon 124 depicted in a downward retracted position. In this example, the translation actuator 216 is shown in the fully retracted position, where the second pivot 604 of the flap coupler link 218 is coincident with the pivot 226 of the track 224. In this example, the flaperon 124 moves to the downward retracted position when extension of the rotation actuator 208 causes the track 224 and, thus, the flaperon 124 to rotate downward (e.g., clockwise in the illustrated example of FIG. 8A) about the pivot 226 and/or the second pivot 604. In such examples, the shroud coupler link 232 causes the upper shroud 230 to rotate downward with the flaperon 124, such that little or no gap is formed between the upper shroud 230 and the flaperon 124 in the downward retracted position.

In the illustrated example of FIG. 8A, a camber of the wing 106 is increased when the flaperon 124 is in the downward retracted position of FIG. 8A in comparison to the neutral position of FIG. 7A, where the camber corresponds to a vertical height of the wing 106 measured from a top of the upper skin 202 to a trailing end 802 of the flaperon 124. In some examples, increasing the camber of the wing 106 affects lift of the wing 106. In some examples, the flaperons 124 on opposite sides of the aircraft 100 of FIG. 1 can be deployed (e.g., moved downward and/or extended) asymmetrically to cause a difference in lift between the wings 106 of the aircraft. In such examples, the difference in lift affect roll of the aircraft 100 of FIG. 1, thereby enabling an increase in turning efficiency of the aircraft 100. In other examples, the flaperons 124 on opposite sides of the aircraft 100 can be deployed symmetrically to increase lift of the aircraft 100 without significantly affecting roll.

FIG. 8B is a side view of the example actuation system 200 with the flaperon 124 depicted in a downward extended position. In this example, the flaperon 124 moves from the downward retracted position shown in connection with FIG. 8A to the downward extended position shown in FIG. 8B when extension of the translation actuator 216 causes the flaperon 124 to slide downward and/or rearward along the track 224. In such examples, the aforementioned gap 704 can be formed between the upper shroud 230 and the flaperon 124 to allow air flow between the top and bottom surfaces 708, 706 of the flaperon 124. Furthermore, the chord and/or the camber of the wing 106 shown in FIG. 1 is increased when the flaperon 124 is in the downward extended position of FIG. 8B in comparison to the downward retracted position of FIG. 8A. As such, the flaperon 124 can be moved to the downward extended position of FIG. 8B to increase lift capabilities of the wing 106. In some examples, the flaperon 124 can be deployed in the downward retracted position of FIG. 8A or the downward extended position of FIG. 8B based on a weight of the aircraft 100. For example, the flaperon 124 may be deployed to the downward retracted position when the weight is less than a threshold weight, and the flaperon 124 may be deployed to the downward extended position when the weight is greater than or equal to the threshold weight.

Figure 9:
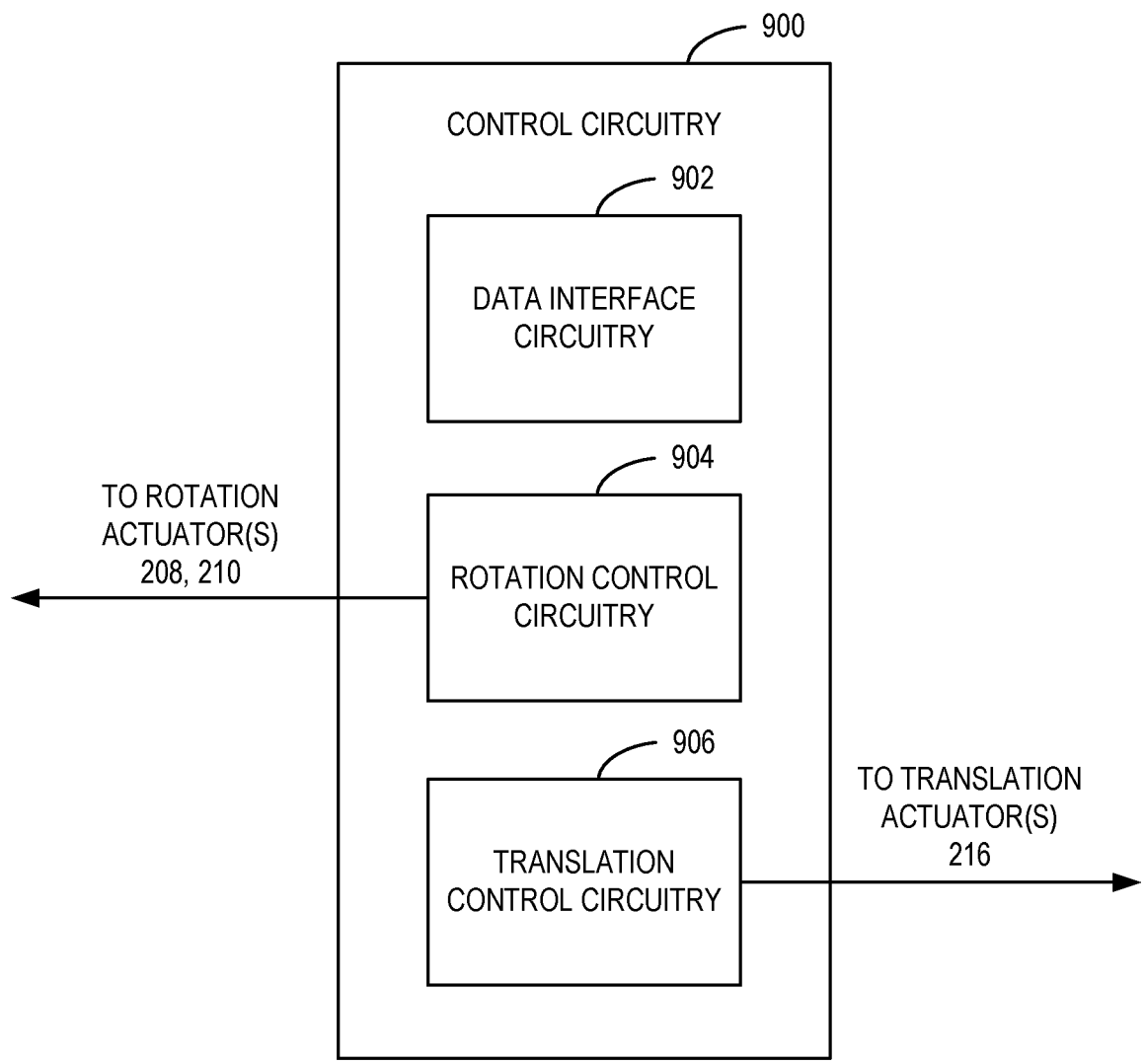
FIG. 9 is a block diagram of example control circuitry to control a position of the example flaperon.

FIG. 9 is a block diagram of example control circuitry 900 to control a position of the flaperon 124 of FIG. 2. The control circuitry 900 of FIG. 9 may be instantiated (e.g., creating an instance of, bring into being for any length of time, materialize, implement, etc.) by processor circuitry such as a central processing unit executing instructions. Additionally or alternatively, the control circuitry 900 of FIG. 9 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 9 may, thus, be instantiated at the same or different times. Some or all of the circuitry may be instantiated, for example, in one or more threads executing concurrently on hardware and/or in series on hardware. Moreover, in some examples, some or all of the circuitry of FIG. 9 may be implemented by one or more virtual machines and/or containers executing on the microprocessor. In the illustrated example of FIG. 9, the example control circuitry 900 includes example data interface circuitry 902, example rotation control circuitry 904, and example translation control circuitry 906.

The data interface circuitry 902 obtains and/or otherwise receives signals for use in determining a desired position and/or a current position of the flaperon 124. For example, the data interface circuitry 902 can obtain one or more control signals from a control system of the aircraft 100, where the control signal(s) can indicate a desired position (e.g., a target position) of the flaperon 124. In some examples, the data interface circuitry 902 also obtains one or more data signals from one or more sensors of the aircraft 100. For example, the data interface circuitry 902 can obtain a first data signal from a first sensor operatively coupled to the flaperon 124, where the first signal indicates a current position of the flaperon 124. Additionally or alternatively, the data interface circuitry 902 obtains a second data signal from a second sensor operatively coupled to at least one of the rotation actuators 208, 210, where the second data signal indicates a position of at least one of the rotation actuators 208, 210. In some such examples, the data interface circuitry 902 can further obtain a third data signal from a third sensor operatively coupled to the translation actuator 216, where the third data signal indicates a position of the translation actuator 216.

The rotation control circuitry 904 is communicatively and/or electrically coupled to the example rotation actuators 208, 210. In some examples, the rotation control circuitry 904 controls the rotation actuator 208, 210 by providing one or more signals (e.g., electrical signals) to the rotation actuators 208, 210 to cause extension and/or retraction thereof. In some examples, the rotation control circuitry 904 controls the rotation actuators 208, 210 based on a desired position (e.g., a target position) of the flaperon 124. In some such examples, the desired position is based on a control signal sent from a control system of the aircraft 100. In some examples, the rotation control circuitry 904 causes the rotation actuators 208, 210 to retract when the desired position is upward relative to a current position of the flaperon 124, and the rotation control circuitry 904 causes the rotation actuators 208, 210 to extend when the desired position is downward relative to the current position of the flaperon 124. In some examples, the rotation control circuitry 904 is instantiated by processor circuitry executing rotation control circuitry instructions and/or configured to perform operations such as those represented by the flowchart of FIG. 12.

The translation control circuitry 906 is communicatively and/or electrically coupled to the example translation actuator 216. In some examples, the translation control circuitry 906 controls the translation actuator 216 by providing one or more signals to the translation actuator 216 to cause extension and/or retraction thereof. In some examples, the translation control circuitry 906 controls the translation actuator 216 based on the desired position and the current position of the flaperon 124. In some examples, the translation control circuitry 906 causes the translation actuator 216 to retract when the desired position is forward relative to a current position of the flaperon 124, and the translation control circuitry 906 causes the translation actuator 216 to extend when the desired position is rearward relative to the current position of the flaperon 124. In some examples, the translation control circuitry 906 is instantiated by processor circuitry executing translation control circuitry instructions and/or configured to perform operations such as those represented by the flowchart of FIG. 12. In some examples, the rotation control circuitry 904 and the translation control circuitry 906 coordinate movement of the rotation actuators 208, 210 and the translation actuator 216 to cause the flaperon 124 to move to the desired position. For example, based on the desired position of the flaperon 124, the rotation control circuitry 904 and the translation control circuitry 906 can simultaneously adjust positions of the rotation actuators 208, 210 and the translation actuator 216 to move the flaperon 124 to the desired position.

In some examples, the control circuitry 900 includes means for interfacing. For example, the means for interfacing may be implemented by the data interface circuitry 902. In some examples, the data interface circuitry 902 may be instantiated by processor circuitry such as the example processor circuitry 1312 of FIG. 13. For instance, the data interface circuitry 902 may be instantiated by the example microprocessor 1400 of FIG. 14 executing machine executable instructions such as those implemented by at least block 1202 of FIG. 12. In some examples, the data interface circuitry 902 may be instantiated by hardware logic circuitry, which may be implemented by an ASIC, XPU, or the FPGA circuitry 1500 of FIG. 15 structured to perform operations corresponding to the machine readable instructions. Additionally or alternatively, the data interface circuitry 902 may be instantiated by any other combination of hardware, software, and/or firmware. For example, the data interface circuitry 902 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the control circuitry 900 includes means for controlling rotation. For example, the means for controlling rotation may be implemented by the rotation control circuitry 904. In some examples, the rotation control circuitry 904 may be instantiated by processor circuitry such as the example processor circuitry 1312 of FIG. 13. For instance, the rotation control circuitry 904 may be instantiated by the example microprocessor 1400 of FIG. 14 executing machine executable instructions such as those implemented by at least blocks 1102, 1112 of FIG. 11 and/or block 1204 of FIG. 12. In some examples, the rotation control circuitry 904 may be instantiated by hardware logic circuitry, which may be implemented by an ASIC, XPU, or the FPGA circuitry 1500 of FIG. 15 structured to perform operations corresponding to the machine readable instructions. Additionally or alternatively, the rotation control circuitry 904 may be instantiated by any other combination of hardware, software, and/or firmware. For example, the rotation control circuitry 904 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the control circuitry 900 includes means for controlling translation. For example, the means for controlling translation may be implemented by the translation control circuitry 906. In some examples, the translation control circuitry 906 may be instantiated by processor circuitry such as the example processor circuitry 1312 of FIG. 13. For instance, the translation control circuitry 906 may be instantiated by the example microprocessor 1400 of FIG. 14 executing machine executable instructions such as those implemented by at least blocks 1108, 1112 of FIG. 11 and/or block 1206 of FIG. 12. In some examples, the translation control circuitry 906 may be instantiated by hardware logic circuitry, which may be implemented by an ASIC, XPU, or the FPGA circuitry 1500 of FIG. 15 structured to perform operations corresponding to the machine readable instructions. Additionally or alternatively, the translation control circuitry 906 may be instantiated by any other combination of hardware, software, and/or firmware. For example, the translation control circuitry 906 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the control circuitry 900 of FIG. 9 is illustrated in FIG. 9, one or more of the elements, processes, and/or devices illustrated in FIG. 9 may be combined, divided, re-arranged, omitted, eliminated, and/or implemented in any other way. Further, the example data interface circuitry 902, the example rotation control circuitry 904, the example translation control circuitry 906, and/or, more generally, the example control circuitry 900 of FIG. 9, may be implemented by hardware alone or by hardware in combination with software and/or firmware. Thus, for example, any of the example data interface circuitry 902, the example rotation control circuitry 904, the example translation control circuitry 906, and/or, more generally, the example control circuitry 900, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example control circuitry 900 of FIG. 9 may include one or more elements, processes, and/or devices in addition to, or instead of, those illustrated in FIG. 9, and/or may include more than one of any or all of the illustrated elements, processes and devices.

Figure 11:
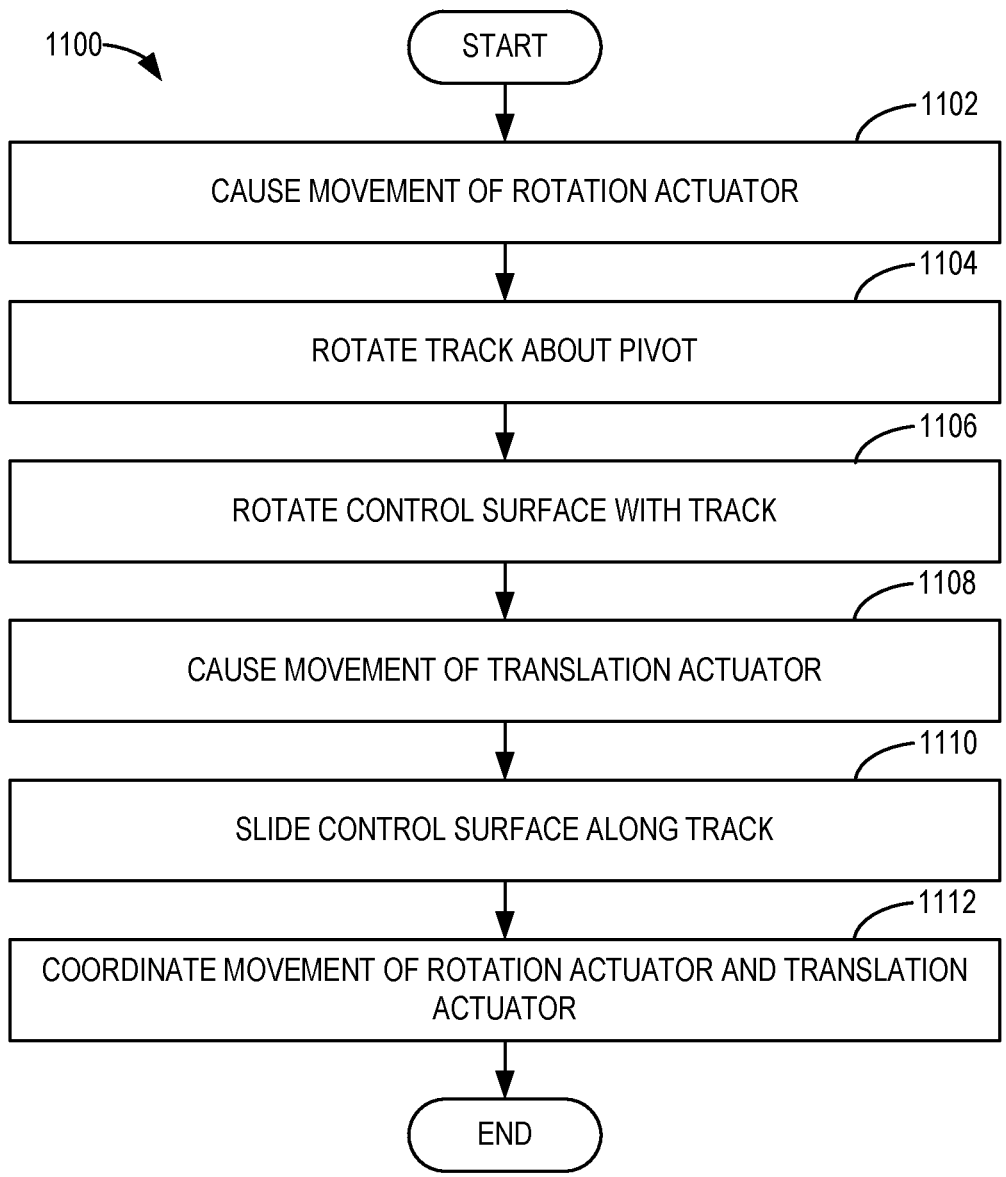
FIG. 11 is a flowchart representative of example instructions and/or example operations to operate examples disclosed herein.

Flowcharts representative of example hardware logic circuitry, machine readable instructions, hardware implemented state machines, and/or any combination thereof for implementing the control circuitry of FIG. 9 is shown in FIGS. 11 and/or 12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 11 and/or 12, many other methods of implementing the example control circuitry 900 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 11 and/or 12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 10:
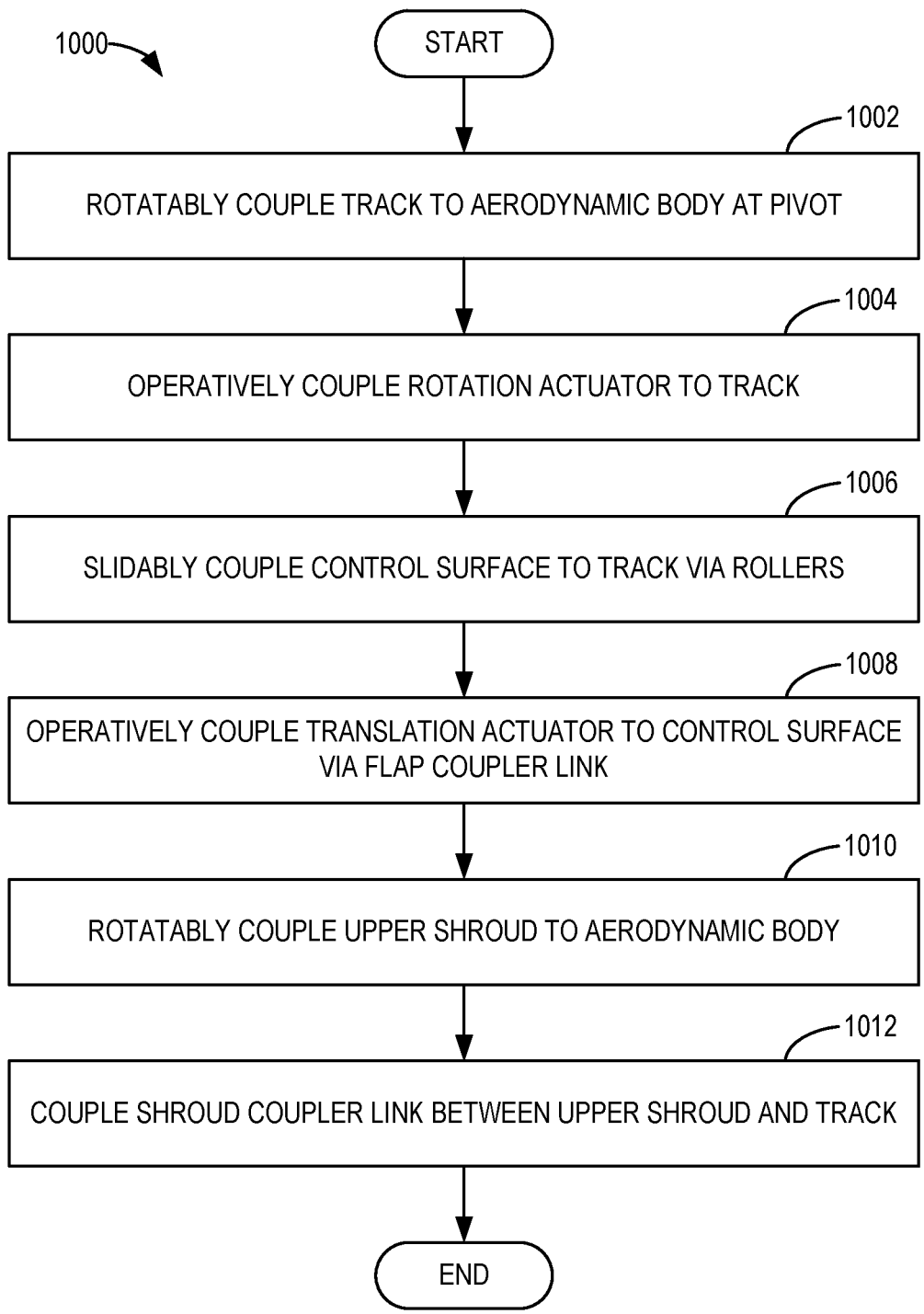
FIG. 10 is a flowchart representative of example instructions and/or example operations to produce examples disclosed herein.

FIG. 10 is a flowchart representative of example instructions and/or example operations 1000 to produce examples disclosed herein. For example, the example instructions 1000 may be executed to produce the example actuation system 200 of FIGS. 2, 7A, 7B, 7C, 8A, and/or 8B. The instructions 1000 of FIG. 10 begin at block 1002, at which the example track 224 is rotatably coupled to an aerodynamic body (e.g., the wing 106) at the example pivot 226. For example, the track 224 is rotatably coupled to the example lower skin 204 of the wing 106 at the pivot 226, such that the track 224 can rotate about the pivot 226.

At block 1004, the example rotation actuator 208 is operatively coupled to the track 224. For example, the rotation actuator 208 is rotatably coupled to the track 224 at the example pivot 228 of the track 224, such that extension and/or retraction of the rotation actuator 208 causes the track 224 to rotate about the pivot 226. In some examples, the rotation actuator 208 can be operatively coupled to multiple ones of the tracks 224 to cause rotation thereof. In other examples, each of the multiple ones of the tracks 224 is controlled via a corresponding one of the rotation actuators 208, 210 operatively coupled thereto. In some examples, at least one track 224 and at least one rotation actuator 208 are implemented in the actuation system 200.

At block 1006, a control surface such as the example flaperon 124 is slidably coupled to the track 224 via the example rollers 508 shown in FIG. 5. For example, the track 224 is placed and/or otherwise disposed in the example cutout 502 of the flaperon 124, and the rollers 508 of the flaperon 124 are at least partially inserted in corresponding ones of the channels 314 of the track 224 to roll along the track 224. In such examples, the flaperon 124 can slide and/or otherwise translate along the track 224 by the rollers 508 rolling within the corresponding channels 314. In other examples, one or more the rollers 508 are implemented on the track 224 instead of the flaperon 124, and the one or more rollers 508 are inserted in corresponding channels of the flaperon 124 to roll therein.

At block 1008, the example translation actuator 216 is operatively coupled to the flaperon 124 via the example flap coupler link 218. For example, the translation actuator 216 is coupled to the flap coupler link 218 at the first example pivot 602, and the flaperon 124 is coupled to the flap coupler link 218 at the second example pivot 604. In such examples, the flaperon 124 is rotatable about the second pivot 604 when the translation actuator 216 is fully retracted, and the flaperon 124 and the flap coupler link 218 are rotatable about the first pivot 602 when the translation actuator 216 is fully extended.

At block 1010, the example upper shroud 230 is rotatably coupled to the aerodynamic body. For example, the upper shroud 230 is coupled to the example upper skin 202 of the aerodynamic body at the example pivot 406 of FIG. 4, such that the upper shroud 230 can rotate about the pivot 406.

At block 1012, the example shroud coupler link 232 is coupled to the upper shroud 230 and the track 224. For example, a first end of the shroud coupler link 232 is coupled to the upper shroud 230 and a second end of the shroud coupler link 232 is coupled to the track 224 at the third example opening 308 of the track 224. In such examples, the shroud coupler link 232 causes the upper shroud 230 to rotate with the track 224 and, thus, the flaperon 124.

FIG. 11 is a flowchart representative of example instructions and/or example operations 1100 to operate examples disclosed herein. For example, the example instructions 1100 may be executed to operate the example actuation system 200 of FIGS. 2, 7A, 7B, 7C, 8A, and 8B. The instructions 1100 of FIG. 11 begin at block 1102, at which the example control circuitry 900 of FIG. 9 causes movement of the example rotation actuator 208. For example, the example rotation control circuitry 904 of FIG. 9 provides one or more signals to the rotation actuator 208 to cause the rotation actuator 208 to extend or retract.

At block 1104, the example track 224 rotates about the example pivot 226. For example, when the rotation actuator 208 extends, the rotation actuator 208 causes the track 224 to rotate downward about the pivot 226. Conversely, when the rotation actuator 208 retracts, the rotation actuator 208 causes the track 224 to rotate upward about the pivot 226.

At block 1106, a control surface such as the example flaperon 124 rotates with the track 224. For example, the flaperon 124 is operatively coupled to the track 224 such that the flaperon 124 rotates upward or downward with the track 224 about the pivot 226.

At block 1108, the example control circuitry 900 causes movement of the example translation actuator 216. For example, the example translation control circuitry 906 of FIG. 9 provides one or more signals to the translation actuator 216 to cause the translation actuator 216 to extend or retract.

At block 1110, the flaperon 124 slides along the track 224. For example, when the translation actuator 216 extends, the translation actuator 216 causes the flaperon 124 to slide along the track 224 in the example rearward direction 220 of FIG. 2. Conversely, when the translation actuator 216 retracts, the translation actuator 216 causes the flaperon 124 to slide along the track 224 in the example forward direction 222 of FIG. 2.

At block 1112, the example control circuitry 900 coordinates movement of the rotation actuator 208 and the translation actuator 216. For example, based on a desired position of the flaperon 124, the rotation control circuitry 904 and the translation control circuitry 906 can simultaneously adjust positions of the rotation actuator 208 and the translation actuator 216 to move the flaperon 124 to the desired position.

Figure 12:
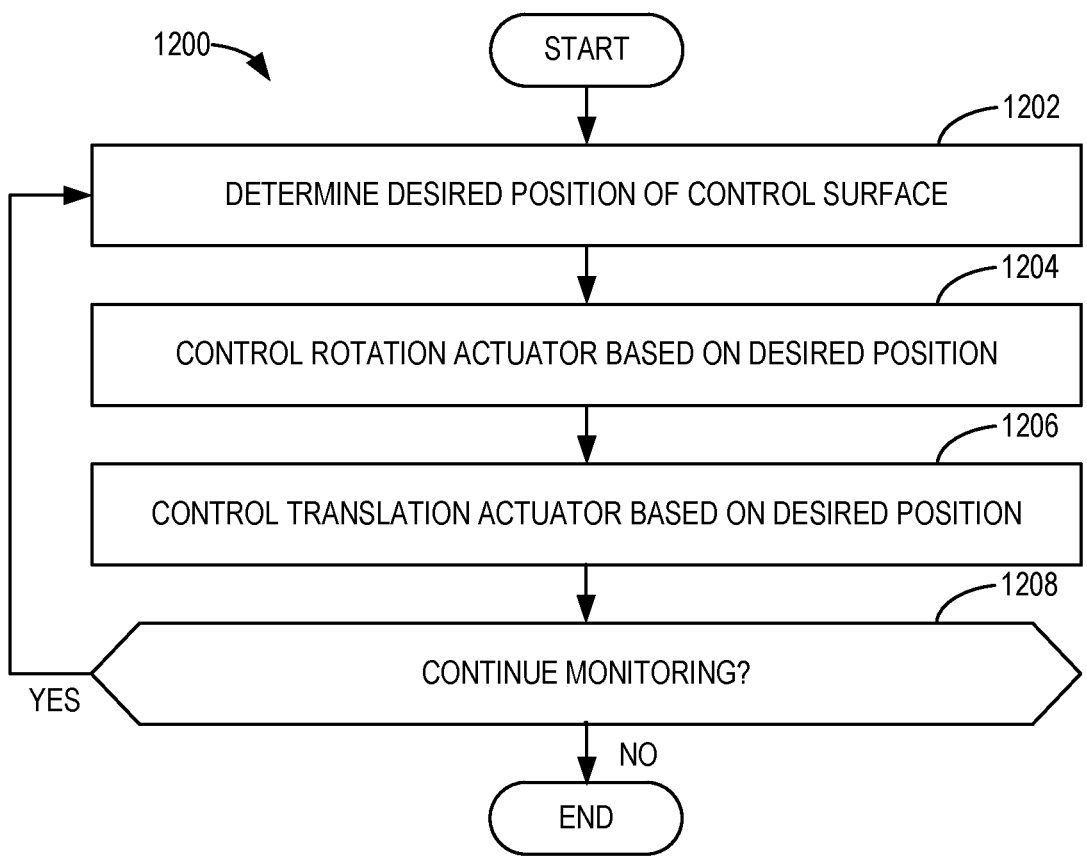
FIG. 12 is a flowchart representative of example machine readable instructions and/or example operations that may be executed by example processor circuitry to implement the example control circuitry of FIG. 9.

FIG. 12 is a flowchart representative of example machine readable instructions and/or example operations 1200 that may be executed and/or instantiated by the example control circuitry 900 of FIG. 9 to control the example actuation system 200 of FIGS. 2, 7A, 7B, 7C, 8A, and 8B. The machine readable instructions and/or the operations 1200 of FIG. 12 begin at block 1202, at which the example control circuitry 900 determines a desired position of a control surface such as the example flaperon 124. For example, the example data interface circuitry 902 of FIG. 9 determines the desired position of the flaperon 124 based on one or more control signals from a control system of the aircraft 100 of FIG. 1. In some examples, the data interface circuitry 902 also determines current positions of the flaperon 124, the example rotation actuator 208, and/or the example translation actuator 216 based on data signals from one or more sensors of the aircraft 100.

At block 1204, the example control circuitry 900 controls the example rotation actuator 208 based on the desired position of the control surface. For example, the example rotation control circuitry 904 of FIG. 9 causes the rotation actuator 208 to retract when the desired position is upward relative to a current position of the flaperon 124. Conversely, the rotation control circuitry 904 causes the rotation actuator 208 to extend when the desired position is downward relative to the current position of the flaperon 124.

At block 1206, the example control circuitry 900 controls the example translation actuator 216 based on the desired position of the control surface. For example, the example translation control circuitry 906 of FIG. 9 causes the translation actuator 216 to retract when the desired position is forward relative to the current position of the flaperon 124. Conversely, the translation control circuitry 906 causes the translation actuator 216 to extend when the desired position is rearward relative to the current position of the flaperon 124. In some examples, the rotation control circuitry 904 and the translation control circuitry 906 coordinate movement and/or positions of the rotation actuator 208 and the translation actuator 216 to move the flaperon 124 to the desired position.

At block 1208, the example control circuitry 900 determines whether to continue monitoring. For example, data interface circuitry 902 determines whether to continue monitoring during flight, takeoff, and/or landing of the aircraft 100. In response to the data interface circuitry 902 determining to continue monitoring (e.g., block 1208 returns a result of YES), control returns to block 1202. Alternatively, in response to the data interface circuitry 902 determining not to continue monitoring (e.g., block 1208 returns a result of NO), controls ends.

Figure 13:
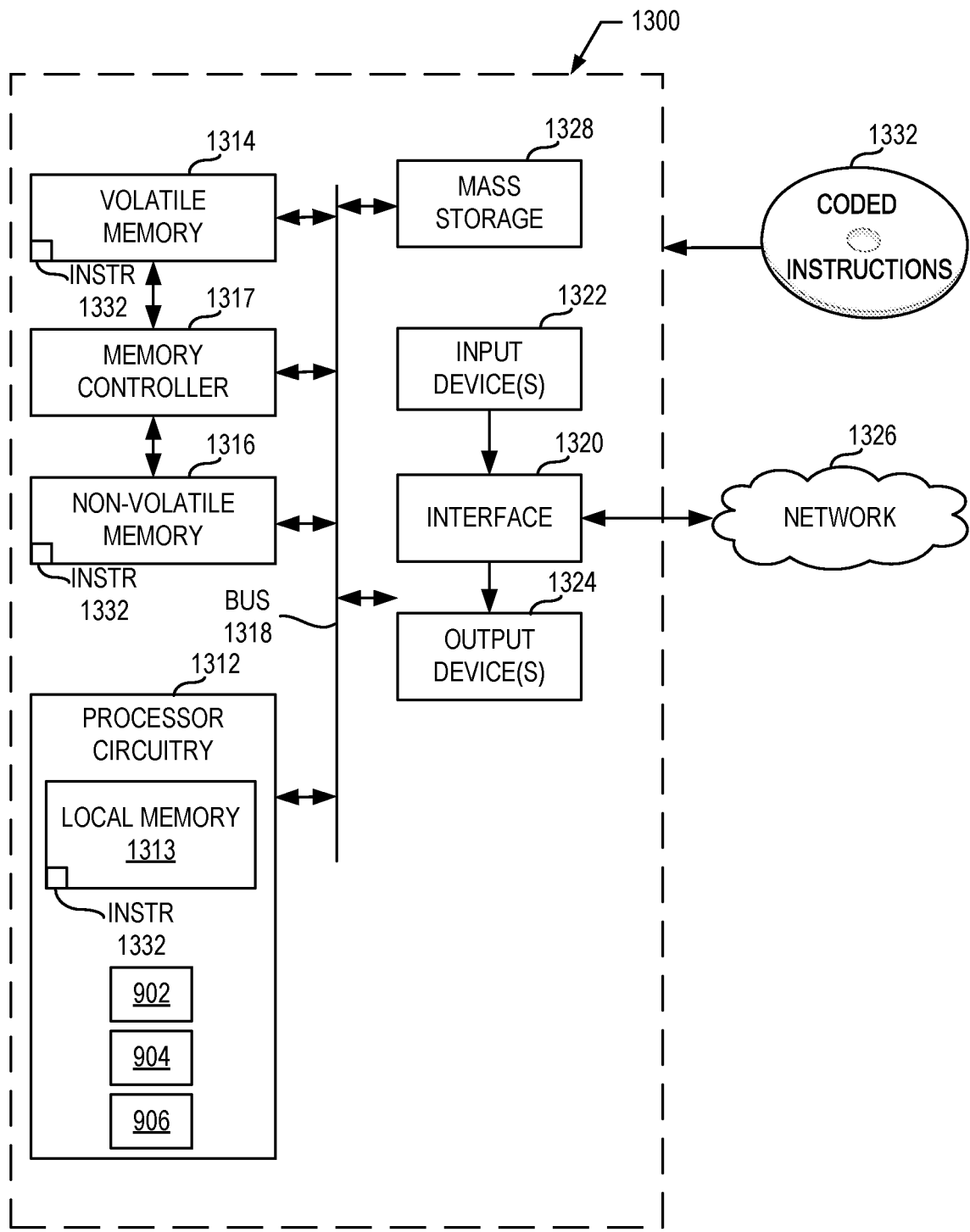
FIG. 13 is a block diagram of an example processing platform including processor circuitry structured to execute the example machine readable instructions and/or the example operations of FIGS. 11 and/or 12 to implement the example control circuitry of FIG. 9.

FIG. 13 is a block diagram of an example processor platform 1300 structured to execute and/or instantiate the machine readable instructions and/or the operations of FIGS. 11 and/or 12 to implement the example control circuitry 900 of FIG. 9. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs, microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example data interface circuitry 902, the example rotation control circuitry 904, and the example translation control circuitry 906.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1332, which may be implemented by the machine readable instructions of FIGS. 11 and/or 12, may be stored in the mass storage device 1328, in the volatile memory 1314, in the non-volatile memory 1316, and/or on a removable non-transitory computer readable storage medium such as a CD or DVD.

Figure 14:
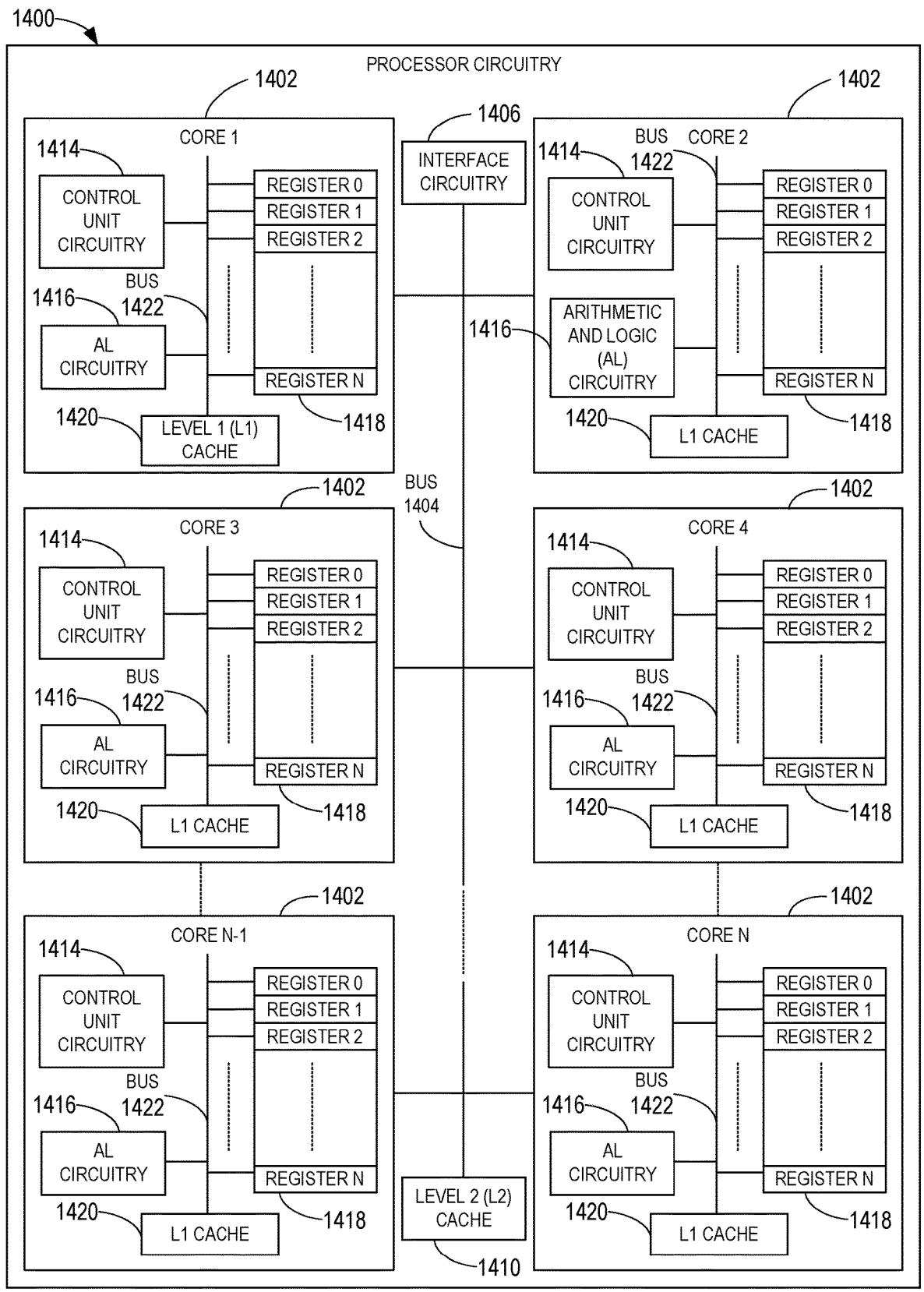
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may be a general purpose microprocessor (e.g., general purpose microprocessor circuitry). The microprocessor 1400 executes some or all of the machine readable instructions of the flowchart of FIGS. 11 and/or 12 to effectively instantiate the control circuitry 900 of FIG. 9 as logic circuits to perform the operations corresponding to those machine readable instructions. In some such examples, the control circuitry 900 of FIG. 9 is instantiated by the hardware circuits of the microprocessor 1400 in combination with the instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 11 and/or 12.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 414, 416 of FIG. 4). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The second bus 1422 may be implemented by at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
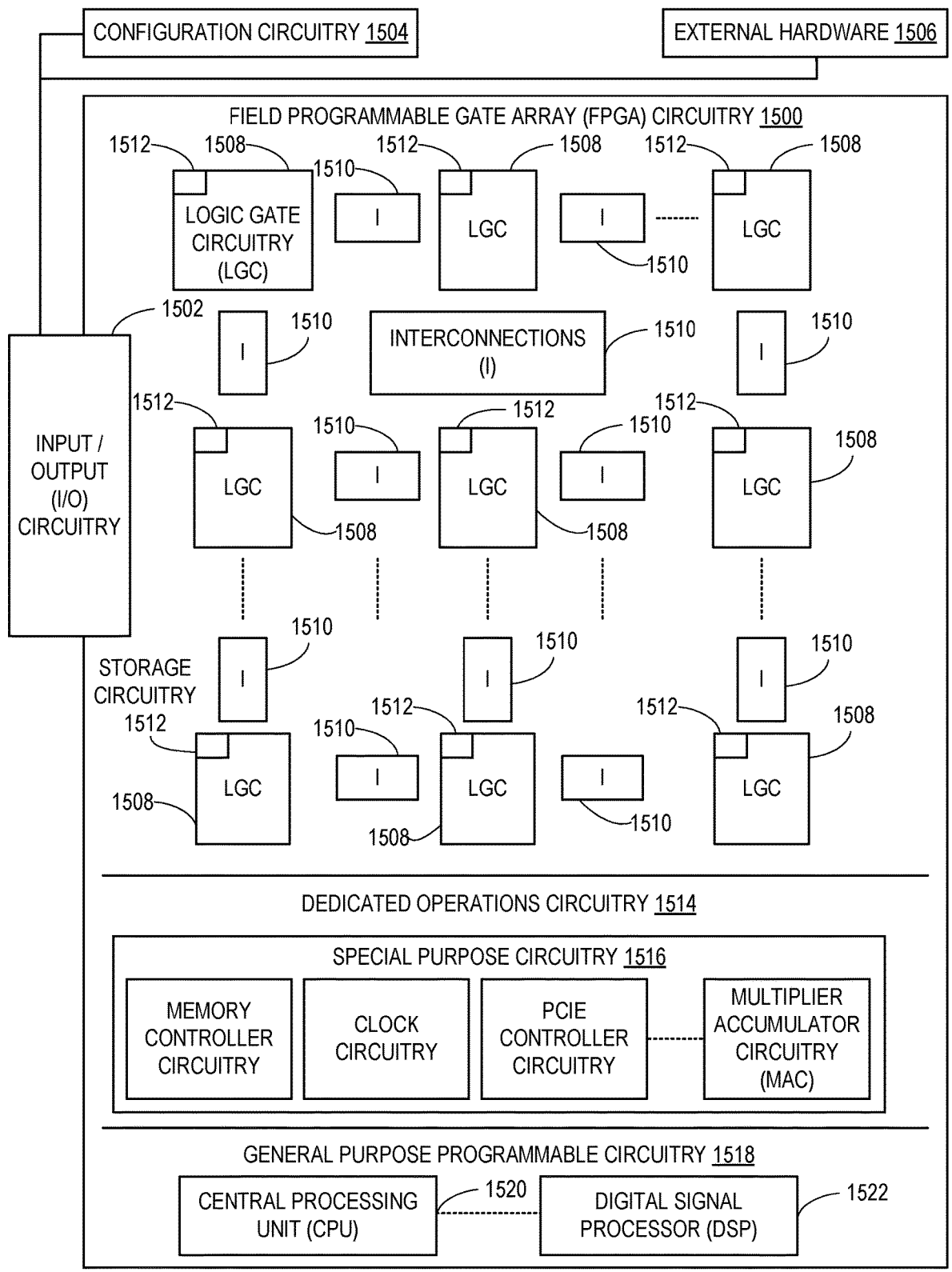
FIG. 15 is a block diagram of another example implementation of the processor circuitry of FIG. 13.

FIG. 15 is a block diagram of another example implementation of the processor circuitry 1312 of FIG. 13. In this example, the processor circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 11 and/or 12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 11 and/or 12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowcharts of FIGS. 11 and/or 12. As such, the FPGA circuitry 1500 may be structured to effectively instantiate some or all of the machine readable instructions of the flowcharts of FIGS. 11 and/or 12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIGS. 11 and/or 12 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry

1502 to obtain and/or output data to/from example configuration circuitry 1504 and/or external hardware 1506. For example, the configuration circuitry 1504 may be implemented by interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may be implemented by external hardware circuitry. For example, the external hardware 1506 may be implemented by the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations that may correspond to at least some of the machine readable instructions of FIGS. 11 and/or 12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 11 and/or 12 may be executed by one or more of the cores 1402 of FIG. 14, a second portion of the machine readable instructions represented by the flowcharts of FIGS. 11 and/or 12 may be executed by the FPGA circuitry 1500 of FIG. 15, and/or a third portion of the machine readable instructions represented by the flowcharts of FIGS. 11 and/or 12 may be executed by an ASIC. It should be understood that some or all of the control circuitry 900 of FIG. 9 may, thus, be instantiated at the same or different times. Some or all of the circuitry may be instantiated, for example, in one or more threads executing concurrently and/or in series. Moreover, in some examples, some or all of the control circuitry 900 of FIG. 9 may be implemented within one or more virtual machines and/or containers executing on the microprocessor.

In some examples, the processor circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that control actuation of a control surface of an aircraft. An example actuation system disclosed herein includes a first actuator to control rotation of the control surface and a second actuator to control translation of the control surface. By controlling movement of the control surface along two degrees of freedom, the example actuation system disclosed herein can increase the chord and/or camber of an aerodynamic body compared to known one degree of freedom systems, thus improving lift capabilities of the aerodynamic body. Furthermore, disclosed systems, methods, apparatus, and articles of manufacture enable air flow through a gap between the control surface and an upper shroud of the aerodynamic body, thus improving lift capabilities without requiring a cove lip door and/or additional fairings to be implemented on the aerodynamic body. Further, by not necessitating a cove lip door and/or additional fairings, examples disclosed herein reduce drag on the aerodynamic body and, thus, improve fuel efficiency of the aircraft. Disclosed systems, methods, apparatus, and articles of manufacture are accordingly directed to one or more improvement(s) in the operation of a machine or other electronic and/or mechanical device.

Example methods, apparatus, systems, and articles of manufacture to control actuation of a control surface of an aircraft are disclosed herein. Further examples and combinations thereof include the following:

Example 1 includes an apparatus to control a control surface of an aerodynamic body, the apparatus comprising a track rotatable about a pivot of a support structure of the aerodynamic body, the control surface slidably coupled to the track, a first actuator operatively coupled to the track, the first actuator to cause rotation of the track and the control surface about the pivot, and a second actuator operatively coupled to the control surface, the second actuator to cause translation of the control surface along the track.

Example 2 includes the apparatus of example 1, further including a coupler link coupled to the control surface at a first end and coupled to the second actuator at a second end, a first rotational axis of the coupler link coincident with the pivot when the second actuator is fully retracted, a second rotational axis of the coupler link coincident with the pivot when the second actuator is fully extended.

Example 3 includes the apparatus of example 1, further including a shroud coupler link coupled to the track at a first end and coupled to an upper shroud of the aerodynamic body at a second end, the shroud coupler link to cause the upper shroud to rotate with the control surface.

Example 4 includes the apparatus of example 3, wherein a gap is formed between the control surface and the upper shroud when the second actuator is at least partially extended, the gap to enable air flow between an upper surface and a lower surface of the control surface.

Example 5 includes the apparatus of example 3, wherein a seal is formed between the control surface and the upper shroud when the second actuator is fully retracted.

Example 6 includes the apparatus of example 1, wherein the track exhibits a generally I-shaped cross-sectional profile to define channels on first and second sides of the track.

Example 7 includes the apparatus of example 6, wherein the track is positioned in a cutout of the control surface, and further including at least two roller bearings disposed in the channels to slidably couple the control surface to the track.

Example 8 includes a method of operating a control surface of an aerodynamic body, the method comprising causing movement of a first actuator operatively coupled to a track, the track rotatable about a pivot of a support structure of the aerodynamic body, the control surface slidably coupled to the track, the movement of the first actuator to cause rotation of the track and the control surface about the pivot, and causing movement of a second actuator operatively coupled to the control surface, the movement of the second actuator to cause translation of the control surface along the track.

Example 9 includes the method of example 8, further including causing an upper shroud of the aerodynamic body to rotate with the control surface.

Example 10 includes the method of example 9, wherein causing movement of the second actuator includes causing extension of the second actuator to form a gap between the control surface and the upper shroud, the gap to enable air flow between an upper surface and a lower surface of the control surface.

Example 11 includes the method of example 8, further including coordinating movement of the first actuator and the second actuator based on a desired position of the control surface.

Example 12 includes the method of example 11, further including determining the desired position based on one or more signals from a control system of an aircraft.

Example 13 includes an aerodynamic body comprising a support structure, a control surface, a track slidably coupled to the control surface and rotatably coupled to the support structure, a first pivot of the track to be moved by a first actuator, the first actuator to cause the track to rotate about a second pivot of the track, and a third pivot of the control surface to be moved by a second actuator coupled to the third pivot via a link, the second actuator to cause the control surface to slide along the track.

Example 14 includes the aerodynamic body of example 13, wherein the first and second pivots are offset from the third pivot along a spanwise direction of the aerodynamic body.

Example 15 includes the aerodynamic body of example 13, further including a shroud coupler link coupled to the track at a first end and coupled to an upper shroud of the aerodynamic body at a second end, the shroud coupler link to cause the upper shroud to rotate with the control surface.

Example 16 includes the aerodynamic body of example 15, wherein a gap is formed between the control surface and the upper shroud when the second actuator is at least partially extended, the gap to enable air flow between an upper surface and a lower surface of the control surface.

Example 17 includes the aerodynamic body of example 15, wherein a seal is formed between the control surface and the upper shroud when the second actuator is fully retracted.

Example 18 includes the aerodynamic body of example 13, wherein the track exhibits a generally I-shaped cross-sectional profile to define channels on first and second sides of the track.

Example 19 includes the aerodynamic body of example 18, wherein the track is positioned in a cutout of the control surface, and further including at least two roller bearings disposed in the channels to slidably couple the control surface to the track.

Example 20 includes the aerodynamic body of example 13, wherein a first rotational axis of the link is coincident with the second pivot when the second actuator is fully retracted, and a second rotational axis of the link is coincident with the second pivot when the second actuator is fully extended.

Example 21 includes a method of manufacturing an aerodynamic body, the method comprising rotatably coupling a track to a pivot of a support structure of the aerodynamic body, slidably coupling a control surface to the track, operatively coupling a first actuator to the track, the first actuator to cause rotation of the track and the control surface about the pivot, and operatively coupling a second actuator to the control surface, the second actuator to cause translation of the control surface along the track.

Example 22 includes the method of example 21, further including coupling a coupler link to the control surface at a first end and coupling the coupler link to the second actuator at a second end, a first rotational axis of the coupler link coincident with the pivot when the second actuator is fully retracted, a second rotational axis of the coupler link coincident with the pivot when the second actuator is fully extended.

Example 23 includes the method of example 21, further including coupling a shroud coupler link to the track at a first end and coupling the shroud coupler link to an upper shroud of the aerodynamic body at a second end, the shroud coupler link to cause the upper shroud to rotate with the control surface.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to control a control surface of an aerodynamic body, the apparatus comprising:
   a track rotatable about a pivot of a support structure of the aerodynamic body, the control surface slidably coupled to the track;
   a first actuator operatively coupled to the track, the first actuator to cause rotation of the track and the control surface about the pivot; and
   a second actuator operatively coupled to the control surface, the second actuator to cause translation of the control surface along the track.

2. The apparatus of claim 1, further including a coupler link coupled to the control surface at a first end and coupled to the second actuator at a second end, a first rotational axis of the coupler link coincident with the pivot when the second actuator is fully retracted, a second rotational axis of the coupler link coincident with the pivot when the second actuator is fully extended.

3. The apparatus of claim 1, further including a shroud coupler link coupled to the track at a first end and coupled to an upper shroud of the aerodynamic body at a second end, the shroud coupler link to cause the upper shroud to rotate with the control surface.

4. The apparatus of claim 3, wherein a gap is formed between the control surface and the upper shroud when the second actuator is at least partially extended, the gap to enable air flow between an upper surface and a lower surface of the control surface.

5. The apparatus of claim 3, wherein a seal is formed between the control surface and the upper shroud when the second actuator is fully retracted.

6. The apparatus of claim 1, wherein the track exhibits an I-shaped cross-sectional profile to define channels on first and second sides of the track.

7. The apparatus of claim 6, wherein the track is positioned in a cutout of the control surface, and further including at least two roller bearings disposed in the channels to slidably couple the control surface to the track.

8. A method of operating a control surface of an aerodynamic body, the method comprising:
   causing movement of a first actuator operatively coupled to a track, the track rotatable about a pivot of a support structure of the aerodynamic body, the control surface slidably coupled to the track, the movement of the first actuator to cause rotation of the track and the control surface about the pivot; and
   causing movement of a second actuator operatively coupled to the control surface, the movement of the second actuator to cause translation of the control surface along the track.

9. The method of claim 8, further including causing an upper shroud of the aerodynamic body to rotate with the control surface.

10. The method of claim 9, wherein causing movement of the second actuator includes causing extension of the second actuator to form a gap between the control surface and the upper shroud, the gap to enable air flow between an upper surface and a lower surface of the control surface.

11. The method of claim 8, further including coordinating movement of the first actuator and the second actuator based on a desired position of the control surface.

12. The method of claim 11, further including determining the desired position based on one or more signals from a control system of an aircraft.

13. An aerodynamic body comprising:
   a support structure;
   a control surface;
   a track slidably coupled to the control surface and rotatably coupled to the support structure;
   a first pivot of the track to be moved by a first actuator, the first actuator to cause the track to rotate about a second pivot of the track; and
   a third pivot of the control surface to be moved by a second actuator coupled to the third pivot via a link, the second actuator to cause the control surface to slide along the track.

14. The aerodynamic body of claim 13, wherein the first and second pivots are offset from the third pivot along a spanwise direction of the aerodynamic body.

15. The aerodynamic body of claim 13, further including a shroud coupler link coupled to the track at a first end and coupled to an upper shroud of the aerodynamic body at a second end, the shroud coupler link to cause the upper shroud to rotate with the control surface.

16. The aerodynamic body of claim 15, wherein a gap is formed between the control surface and the upper shroud when the second actuator is at least partially extended, the gap to enable air flow between an upper surface and a lower surface of the control surface.

17. The aerodynamic body of claim 15, wherein a seal is formed between the control surface and the upper shroud when the second actuator is fully retracted.

18. The aerodynamic body of claim 13, wherein the track exhibits an I-shaped cross-sectional profile to define channels on first and second sides of the track.

19. The aerodynamic body of claim 18, wherein the track is positioned in a cutout of the control surface, and further including at least two roller bearings disposed in the channels to slidably couple the control surface to the track.

20. The aerodynamic body of claim 13, wherein a first rotational axis of the link is coincident with the second pivot when the second actuator is fully retracted, and a second rotational axis of the link is coincident with the second pivot when the second actuator is fully extended.

21. A method of manufacturing an aerodynamic body, the method comprising:
   rotatably coupling a track to a pivot of a support structure of the aerodynamic body;
   slidably coupling a control surface to the track;
   operatively coupling a first actuator to the track, the first actuator to cause rotation of the track and the control surface about the pivot; and
   operatively coupling a second actuator to the control surface, the second actuator to cause translation of the control surface along the track.

22. The method of claim 21, further including coupling a coupler link to the control surface at a first end and coupling the coupler link to the second actuator at a second end, a first rotational axis of the coupler link coincident with the pivot when the second actuator is fully retracted, a second rotational axis of the coupler link coincident with the pivot when the second actuator is fully extended.

23. The method of claim 21, further including coupling a shroud coupler link to the track at a first end and coupling the shroud coupler link to an upper shroud of the aerodynamic body at a second end, the shroud coupler link to cause the upper shroud to rotate with the control surface.

* * * * *